US012670872B2

(12) United States Patent
Wu et al.

(10) Patent No.: US 12,670,872 B2
(45) Date of Patent: Jun. 30, 2026

(54) DISPLAY DEVICE

(71) Applicant: Qisda Corporation, Taoyuan City (TW)

(72) Inventors: Chun-Chang Wu, Taoyuan City (TW); Chi-Hsing Chang, Taoyuan City (TW); Yan-Neng Fang, Taoyuan City (TW); Min-Jye Chen, Taoyuan City (TW)

(73) Assignee: Qisda Corporation, Taoyuan City (TW)

( * ) Notice: Subject to any disclaimer, the term of this patent is extended or adjusted under 35 U.S.C. 154(b) by 0 days.

(21) Appl. No.: 18/586,572

(22) Filed: Feb. 26, 2024

(65) Prior Publication Data

US 2024/0331644 A1 Oct. 3, 2024

(30) Foreign Application Priority Data

Mar. 31, 2023 (CN) .......................... 202310333816.5
Oct. 11, 2023 (CN) .......................... 202311315796.5

(51) Int. Cl.
G09G 3/34 (2006.01)
G06T 13/80 (2011.01)
G09G 3/36 (2006.01)

(52) U.S. Cl.
CPC ........... *G09G 3/3406* (2013.01); *G06T 13/80* (2013.01); *G09G 3/36* (2013.01); *G06T 2200/24* (2013.01); *G09G 2320/0247* (2013.01); *G09G 2320/0252* (2013.01); *G09G*

2320/0257 (2013.01); *G09G 2320/0261* (2013.01); *G09G 2320/0271* (2013.01); *G09G 2320/064* (2013.01); *G09G 2320/08* (2013.01); *G09G 2330/12* (2013.01); *G09G 2354/00* (2013.01); *G09G 2360/00* (2013.01)

(58) Field of Classification Search
CPC ................... G09G 3/3406; G09G 3/36; G09G 2320/0247; G09G 2320/0252; G09G 2320/0261; G09G 2320/064; G09G 2320/08; G09G 2330/12; G09G 2354/00; G09G 2360/00; G09G 2320/0257; G09G 2320/0271; G06T 13/80; G06T 2200/24
See application file for complete search history.

(56) References Cited

U.S. PATENT DOCUMENTS 11,194,471 B1 * 12/2021 Jacome ............... G06F 3/04842
2023/0328356 A1 * 10/2023 Wu ........................ H04N 23/73
348/207.99

* cited by examiner

*Primary Examiner* — Adam R. Giesy
(74) *Attorney, Agent, or Firm* — JCIPRNET

(57) ABSTRACT

The invention provides a display device. The display device includes a display unit and a processing unit. The processing unit is coupled to the display unit. The processing unit provides a user interface through the display unit to prompt a user to adjust at least one response effect. The processing unit presents an image quality checking animation through the display unit or the user interface. The processing unit reflects an adjustment of the response effect in the image quality checking animation in real time.

20 Claims, 14 Drawing Sheets

DISPLAY DEVICE

CROSS-REFERENCE TO RELATED APPLICATION

This application claims the priority benefit of China application serial no. 202310333816.5, filed on Mar. 31, 2023, and China application serial no. 202311315796.5, filed on Oct. 11, 2023. The entirety of each of the above-mentioned patent applications is hereby incorporated by reference herein and made a part of this specification.

BACKGROUND

Technical Field

The disclosure relates to an electronic device, and in particular to a display device.

Description of Related Art

Due to the pixel response time of the liquid crystal, the liquid crystal display has a motion blur phenomenon when displaying a dynamic image. The display usually uses over-drive (OD) or other motion blur reduction technologies to improve image quality. In order to optimize the image quality of the display, the general overdrive technology needs to perform gray-to-gray (GtG) time domain waveform measurements on the display many times beforehand, then optimize an overdrive lookup table (LUT) using an algorithm, and store the overdrive lookup table inside the display. However, such an adjustment manner takes several hours and requires expensive equipment and software. Therefore, the display generally does not allow the user to adjust the overdrive lookup table after leaving the factory. Such a static overdrive lookup table cannot satisfy the individual preference of the user for image quality. In addition, without dynamically adjusting the overdrive lookup table according to the current parameters of the display, the display is prone to issues such as blurring, smearing, and ghosting.

It should be noted that the content of the "Description of Related Art" section is used to help understand the disclosure. Some (or all) of the content disclosed in the "Description of Related Art" section may not be known to persons with ordinary skill in the art. The content disclosed in the "Description of Related Art" does not mean that the content has been known to persons with ordinary skill in the art before the application of the disclosure.

SUMMARY

The disclosure provides a display device to provide an image quality checking animation that reflects an adjustment effect by a user in real time.

In an embodiment of the disclosure, the display device includes a display unit and a processing unit. The processing unit is coupled to the display unit. The processing unit provides a user interface through a display unit to prompt a user to adjust at least one response effect. The processing unit presents an image quality checking animation through the display unit or the user interface. The processing unit reflects an adjustment of the at least one response effect in the image quality checking animation in real time.

Based on the above, in some embodiments, the processing unit may provide the user interface through the display unit to prompt the user to adjust the at least one response effect.

The user may operate the display device to set the response effect. Based on actual designs and applications, the response effect may include a backlight parameter, a target response time, a target overshoot percentage, a target ClearMR value, or other current parameters of the display. ClearMR is a grading index provided by the Video Electronics Standards Association (VESA) for the motion blur performance of a digital display. The processing unit can provide the image quality checking animation that reflects the adjustment effect by the user in real time.

In order for the features and advantages of the disclosure to be more comprehensible, the following specific embodiments are described in detail in conjunction with the drawings.

DESCRIPTION OF THE EMBODIMENTS

Figure 1:
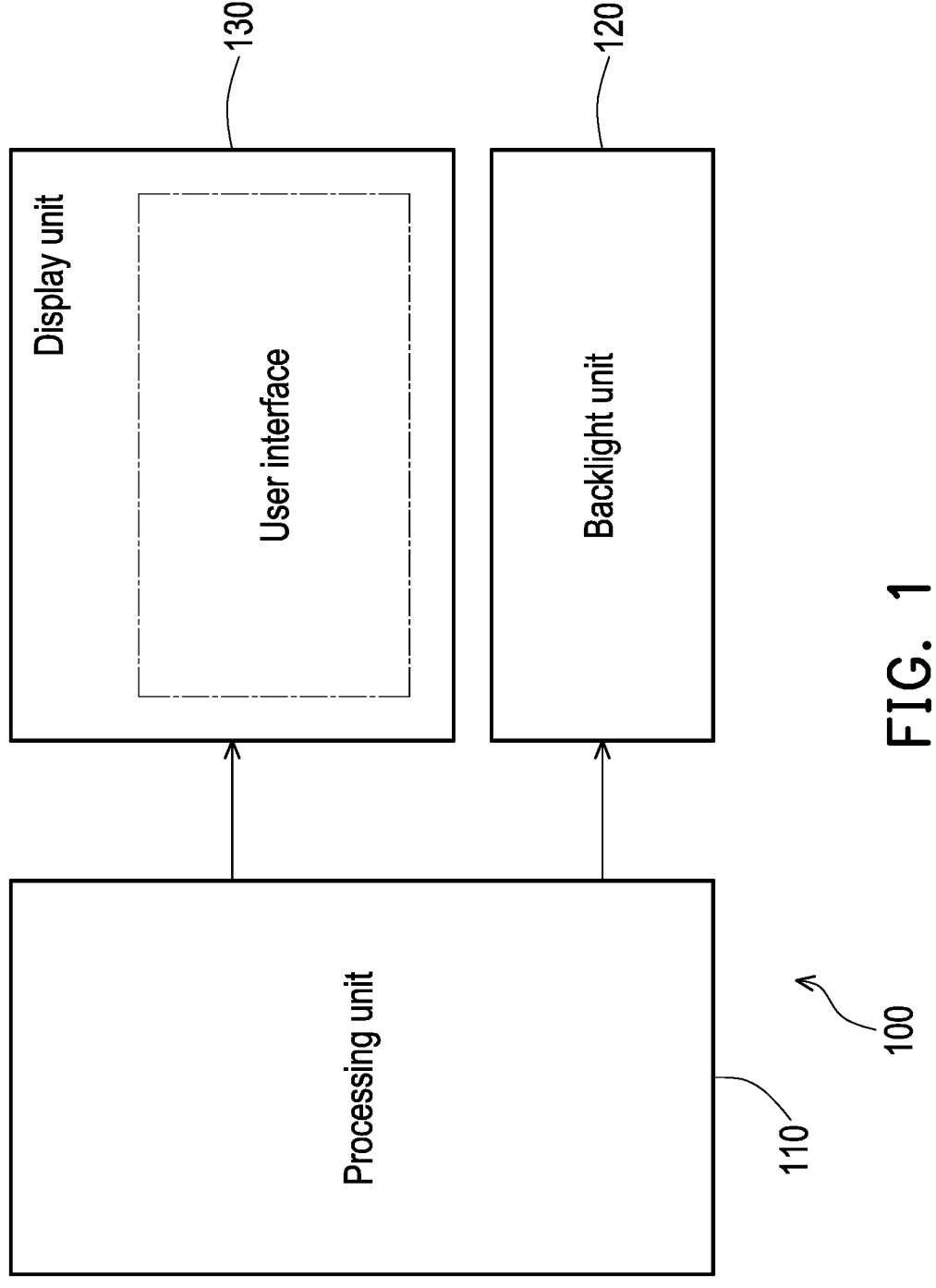
FIG. 1 is a schematic diagram of a function block of a display device according to an embodiment of the disclosure.

The term "coupling (or connection)" used in the entire specification (including the claims) of the disclosure may refer to any direct or indirect connection means. For example, if a first device is described as being coupled (or connected) to a second device, it should be interpreted that the first device may be directly connected to the second device or the first device may be indirectly connected to the second device through another device or certain connection means. Terms such as "first" and "second" mentioned in the entire specification (including the claims) of the disclosure are used to name the elements or to distinguish between different embodiments or ranges, but not to limit the upper limit or the lower limit of the number of elements or to limit the sequence of the elements. In addition, wherever possible, elements/components/steps using the same reference numerals in the drawings and the implementation manners represent the same or similar parts. Relevant descriptions of the elements/components/steps using the same reference numerals or using the same terminologies in different embodiments may be cross-referenced.

FIG. 1 is a schematic diagram of a function block of a display device 100 according to an embodiment of the disclosure. The display device 100 shown in FIG. 1 includes a processing unit 110, a backlight unit 120, and a display unit 130. According to different designs, in some embodiments, the processing unit 110 may be a processor in a computer host. In other embodiments, the processing unit 110 may be a processor in a display. The processing unit 110 is coupled to the backlight unit 120 and the display unit 130. Based on the control of the processing unit 110, the backlight unit 120 may provide backlight to the display unit 130. Based on actual designs, in some embodiments, the display unit 130 may include a liquid crystal display (LCD) panel, other display panels, or other display modules.

The processing unit 110 may provide a user interface through the display unit 130 to prompt a user to adjust at least one response effect of the backlight unit 120 and/or the display unit 130. The processing unit 110 may present an image quality checking animation on the display unit 130 through the user interface, or may present the image quality checking animation through the display unit 130. The processing unit 110 may reflect an adjustment of the at least one response effect in the image quality checking animation of the display unit 130 in real time. For example, the user may operate a user interface 200 to set a response time (a target response effect) of the display unit 130, and set a target response time to 3.0 ms or other time values. Alternatively, the user may operate the user interface to set an overshoot percentage (a target response effect) of the display unit 130, and set a target overshoot percentage to 20% or other overshoot percentages. Alternatively, the user may operate the user interface to set a backlight parameter (a response effect) of the backlight unit 120, and the processing unit 110 adjusts driving of the backlight unit 120 in real time based on an adjustment result of the backlight parameter.

The backlight parameter includes a first backlight parameter and a second backlight parameter. The image quality checking animation includes a first portion and a second portion. The processing unit 110 may adjust the driving of the backlight unit 120 based on the first backlight parameter to reflect an adjustment of the first backlight parameter in the first portion of the image quality checking animation in real time. The processing unit 110 may adjust the driving of the backlight unit 120 based on the second backlight parameter to reflect an adjustment of the second backlight parameter in the second portion of the image quality checking animation in real time. The first portion and the second portion of the image quality checking animation are presented on the display unit 130 or the user interface 200.

The specific content of the image quality checking animation and/or the user interface may be decided according to actual designs. For example (but not limited to this), reference may be made to the relevant descriptions of the following embodiments for the specific implementation of the image quality checking animation and/or the user interface.

Figure 2:
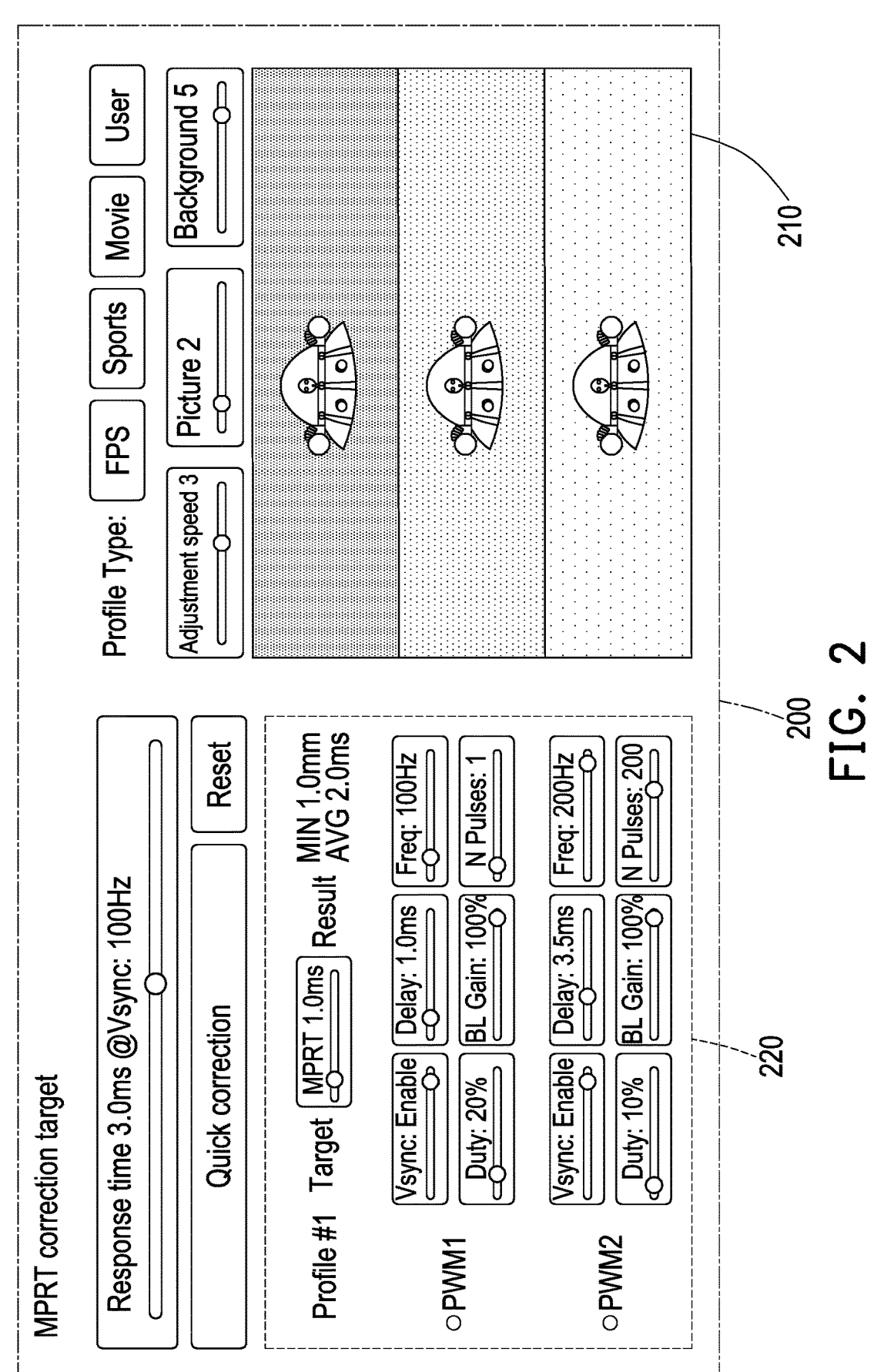
FIG. 2 is a schematic diagram of a user interface according to an embodiment of the disclosure.

FIG. 2 is a schematic diagram of a user interface 200 according to an embodiment of the disclosure. The user interface 200 shown in FIG. 2 may be used as one of many examples of the user interface shown in FIG. 1. In the embodiment shown in FIG. 2, the processing unit 110 may provide the user interface 200 through the display unit 130. The user may operate the user interface 200 to set/adjust the at least one response effect of the backlight unit 120 and/or the display unit 130. For example, the response effect includes at least one backlight parameter of the backlight unit 120. The user may operate the user interface 200 to set backlight parameters PWM1 and PWM2 of the backlight unit 120.

The user interface 200 shown in FIG. 2 includes an image quality checking animation 210 and an adjustment setting 220. The user may operate the adjustment setting 220 to set the backlight parameters PWM1 and PWM2 (the response effects) of the backlight unit 120. Adjustments of the backlight parameters PWM1 and PWM2 include at least one of a pulse width modulation (PWM) delay, a PWM frequency, a PWM duty cycle, a PWM gain, a number of backlight pulses, a PWM start position, a PWM end position, synchronization enable of a backlight pulse to a vertical synchronization signal Vsync, synchronization enable of a backlight pulse to a variable refresh rate (VRR) vertical synchronization signal, etc. Based on adjustment results of the backlight parameters PWM1 and PWM2, the processing unit 110 may adjust the driving of the backlight unit 120 in real time, so that the adjustments of the backlight parameters PWM1 and PWM2 may be reflected/presented on the display unit 130 or in the image quality checking animation 210 of the display unit 130 in real time. In response to the vertical synchronization signal Vsync of the display unit 130 being adjusted to different frequencies, the processing unit 110 sets the backlight parameter to different parameter values.

Figure 3:
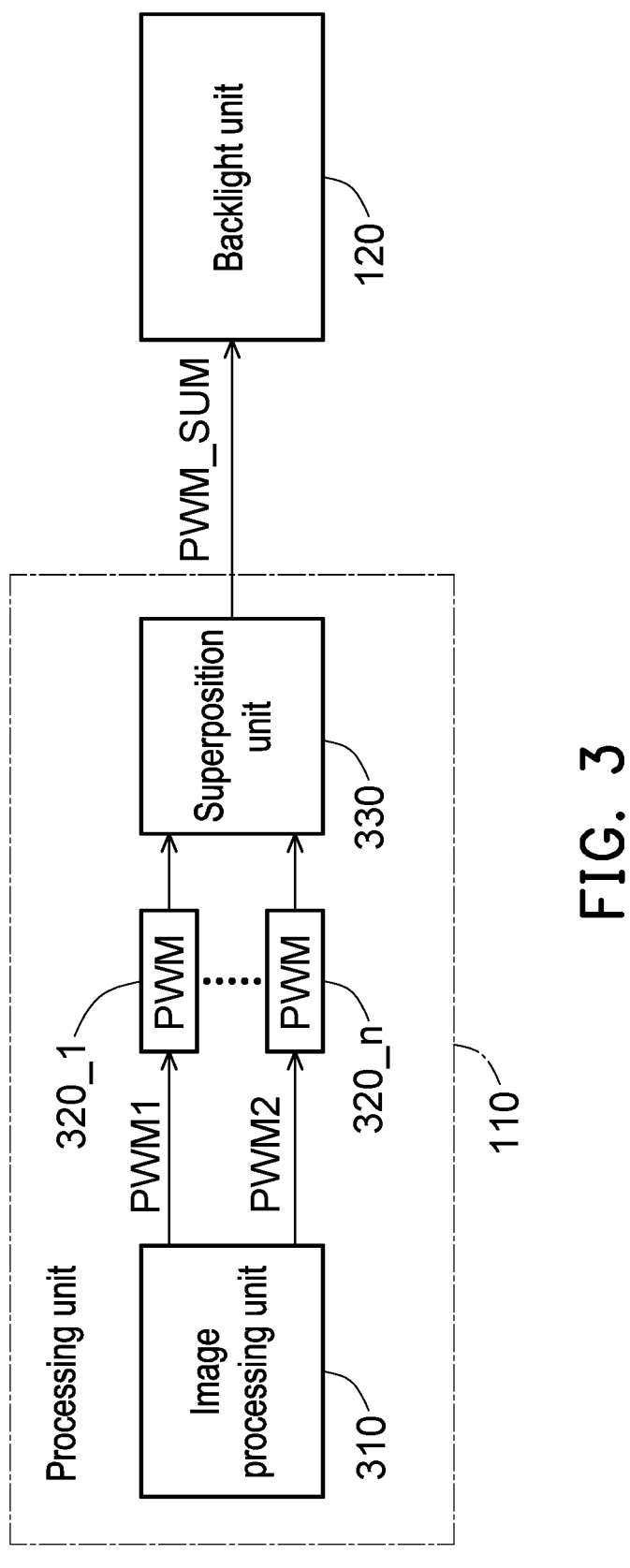
FIG. 3 is a schematic diagram of a function block of a processing unit according to an embodiment of the disclosure.

FIG. 3 is a schematic diagram of a function block of the processing unit 110 according to an embodiment of the disclosure. The processing unit 110 shown in FIG. 3 includes an image processing unit 310, multiple pulse width modulation (PWM) units (for example, 320_1 to 320_n), and a superposition unit 330. In the embodiment, the backlight parameter includes multiple pulse width modulation parameter sets. The processing unit 110 generates a corresponding pulse width modulation signal based on each pulse width modulation parameter set (for example, the backlight parameter PWM1 or PWM2). The processing unit 110 superimposes each corresponding pulse width modulation signal to generate a superimposed signal PWM_SUM. The processing unit 110 drives the backlight unit 120 using the superimposed signal PWM_SUM to provide backlight to the display unit 130.

In detail, based on an adjustment result of the adjustment setting 220 by the user, the image processing unit 310 may respectively provide the backlight parameters PWM1 and PWM2 (multiple pulse width modulation parameter sets) to the pulse width modulation units 320_1 to 320_n in real time to adjust the driving of the backlight unit 120. Each of the pulse width modulation units 320_1 to 320_n generates a corresponding pulse width modulation signal to the superposition unit 330 based on a corresponding pulse width modulation parameter set (for example, the backlight parameter PWM1 or PWM2) among the pulse width modulation parameter sets. The superposition unit 330 is coupled to the pulse width modulation units 320_1 to 320_n to receive each corresponding pulse width modulation signal. The superposition unit 330 generates the superimposed signal PWM_SUM to the backlight unit 120.

Figure 4:
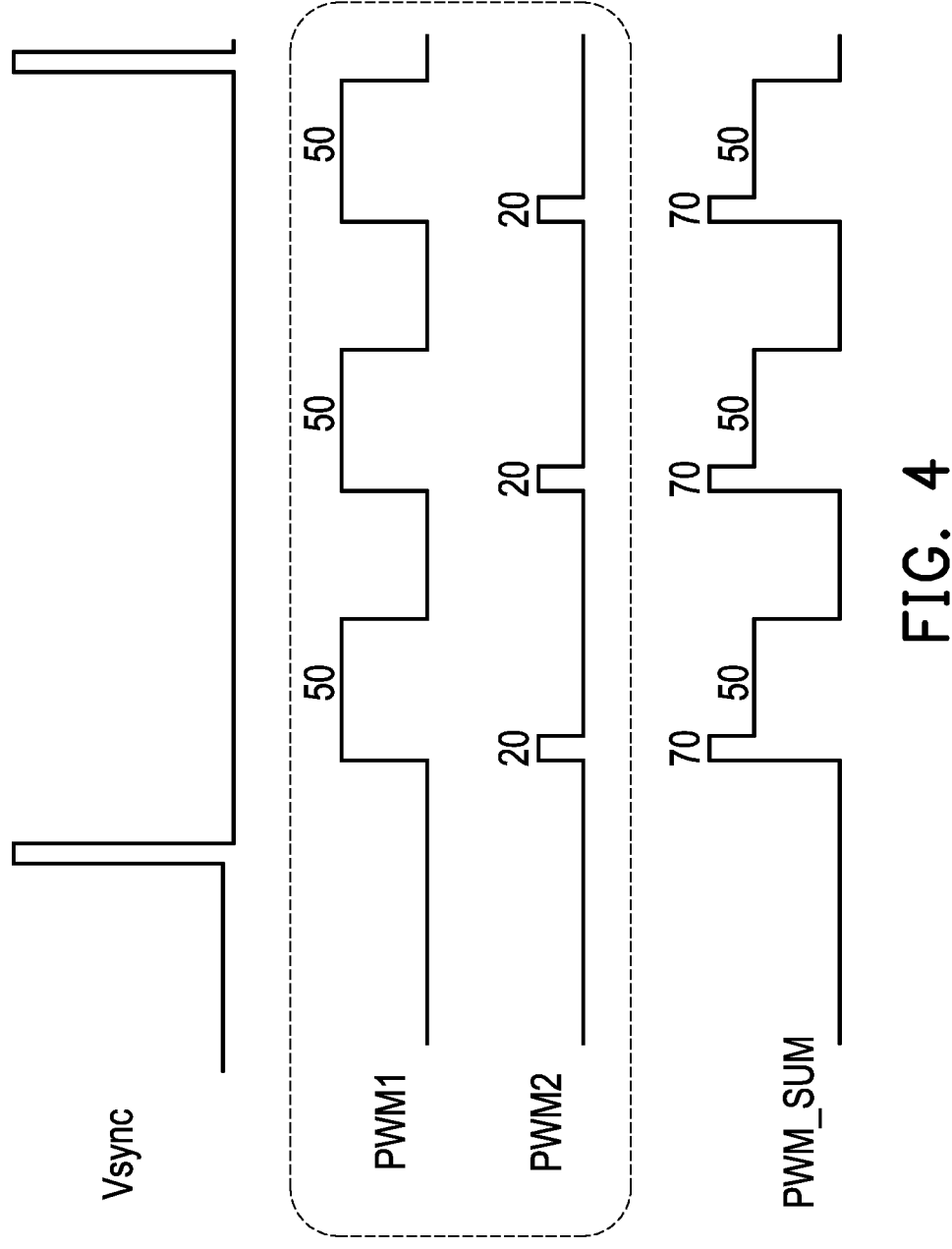
FIG. 4 is a schematic diagram of a backlight parameter waveform of a user interface according to an embodiment of the disclosure.

In some embodiments, the user interface further includes a backlight parameter waveform diagram. For example, FIG. 4 is a schematic diagram of the backlight parameter waveform of the user interface according to an embodiment of the disclosure. The horizontal axis in FIG. 4 represents time. The upper part of FIG. 4 shows a schematic diagram of a waveform of the vertical synchronization signal Vsync. The middle part of FIG. 4 shows a schematic diagram of waveforms of the corresponding pulse width modulation signals generated by the pulse width modulation units 320_1 and 320_$n$ based on the backlight parameters PWM1 and PWM2. The lower part of FIG. 4 shows a schematic diagram of a waveform of the superimposed signal PWM_SUM. The processing unit 110 adjusts the backlight parameter waveform diagram of the user interface in real time based on the adjustment results of the backlight parameters PWM1 and PWM2.

Figure 5:
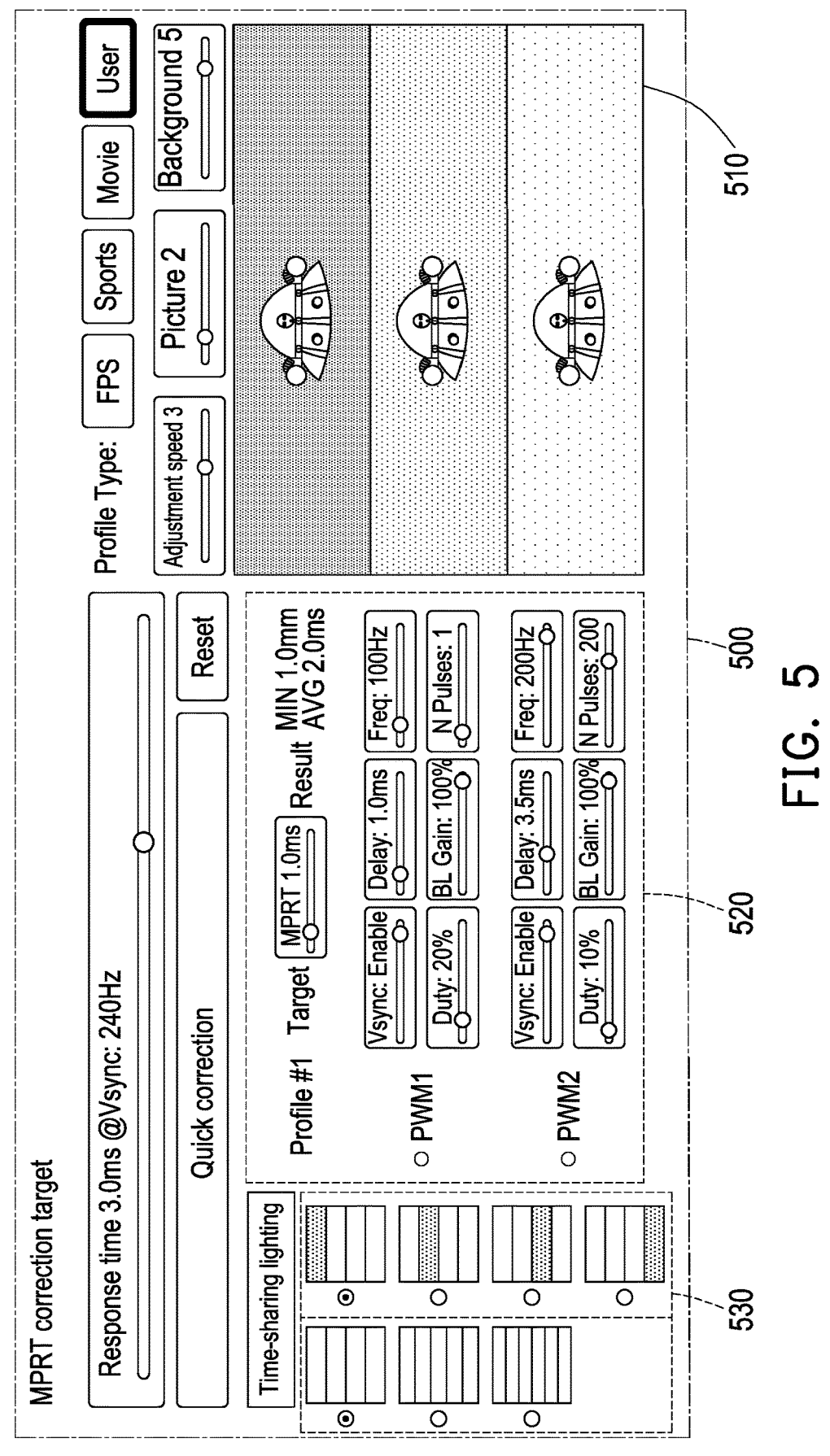
FIG. 5 is a schematic diagram of a user interface according to another embodiment of the disclosure.

FIG. 5 is a schematic diagram of a user interface 500 according to another embodiment of the disclosure. The user interface 500 shown in FIG. 5 may be used as one of many examples of the user interface shown in FIG. 1. In the embodiment shown in FIG. 5, the user interface 500 includes an image quality checking animation 510, an adjustment setting 520, and a time-sharing lighting setting 530. Reference may be made to the relevant descriptions of the user interface 200, the image quality checking animation 210, and the adjustment setting 220 shown in FIG. 2 for the user interface 500, the image quality checking animation 510, and the adjustment setting 520 shown in FIG. 5. In the embodiment shown in FIG. 5, the user may adjust a regional time-sharing profile in the time-sharing lighting setting 530, such as selecting to divide a screen into four, five, or six equal parts from top to bottom or left to right, etc., and adjusting a backlight parameter of each equal part by the adjustment setting 520, that is, respectively adjusting different PWM profiles of different regions of the backlight unit 120 after selecting each equal part. For example, by adjusting the regional time-sharing profile in the time-sharing lighting setting 530, the upper and lower regions of the display unit 130 may not flicker, and the middle region may be adjusted.

In a game situation, the upper and lower regions of the display unit 130 may display scores, and a console does not need to turn on a "moving picture response time (MPRT)" display. In a movie situation, the upper and lower regions of the display unit 130 may present black borders, so that viewing of subtitles is more comfortable. Also, in an online live broadcast situation, the left and right regions of the display unit 130 may display a chat room without flickering, so that reading of messages is more comfortable, while the backlight parameter may be adjusted in the middle region, so that the live broadcast screen is smoother.

Figure 6:
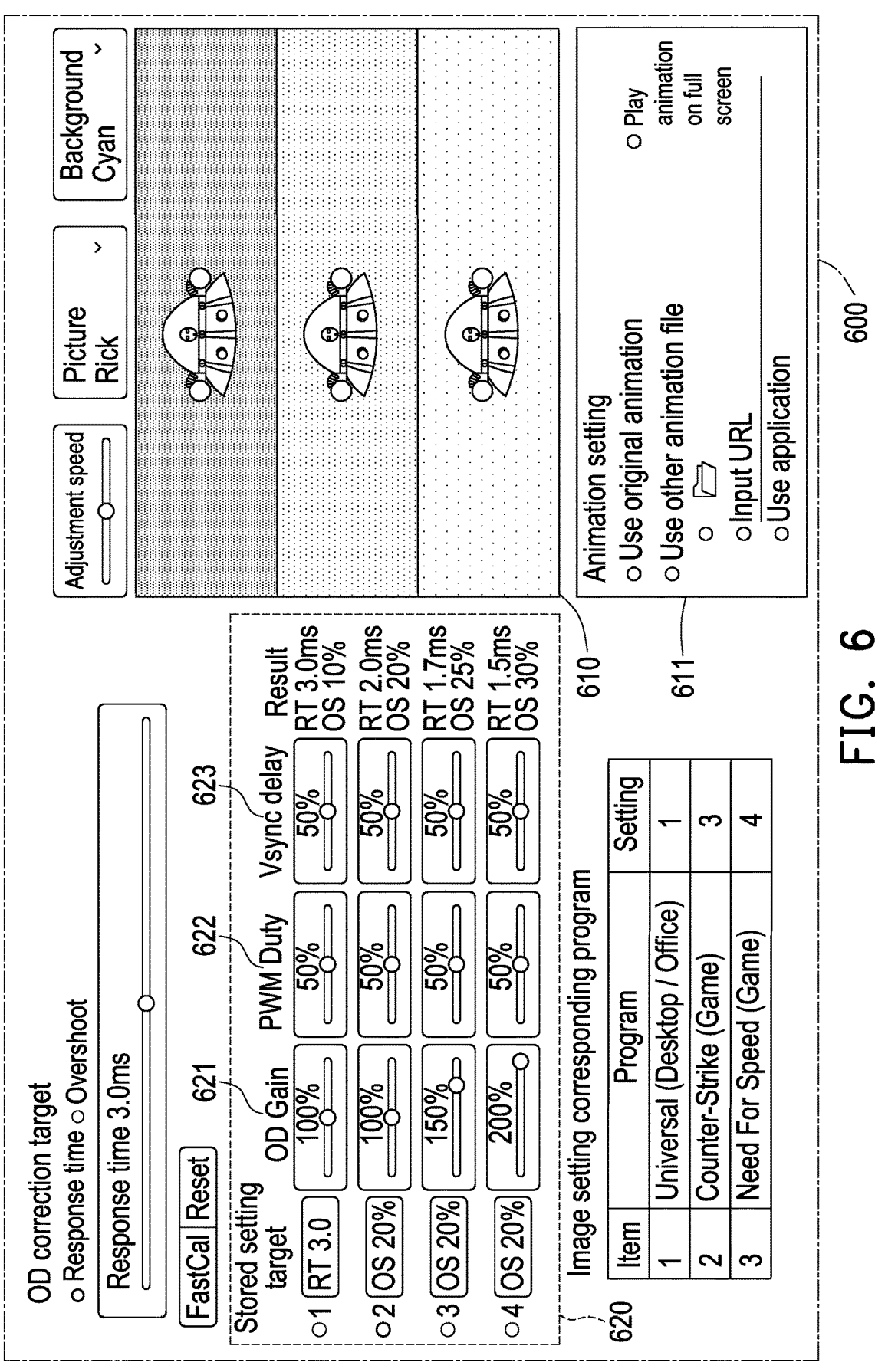
FIG. 6 is a schematic diagram of a user interface according to yet another embodiment of the disclosure.

FIG. 6 is a schematic diagram of a user interface 600 according to another embodiment of the disclosure. The user interface 600 shown in FIG. 6 may be used as one of many examples of the user interface shown in FIG. 1. In the embodiment shown in FIG. 6, the user interface 600 includes an image quality checking animation 610, an adjustment setting 620, and an animation setting 611. Reference may be made to the relevant descriptions of the user interface 200, the image quality checking animation 210, and the adjustment setting 220 shown in FIG. 2 for the user interface 600, the image quality checking animation 610, and the adjustment setting 620 shown in FIG. 6.

In the embodiment shown in FIG. 6, the animation setting 611 is used to set or adjust the image quality checking animation 610. A setting of the image quality checking animation 610 is, for example, presenting the image quality checking animation 610 using an original animation or using other animations. The adjustment of the image quality checking animation 610 is, for example, making the image quality checking animation 610 full screen to confirm the image quality performance in more detail. For example, using other animations includes opening for use from any storage device, entering a website with animation, or using an application (for example, an application initial animation of a shooting game, a racing game, etc.), etc., which may all present the corresponding image quality checking animation 610 for the user to determine the image quality performance. In the embodiment shown in FIG. 6, the animation setting 611 at least includes a "use original animation" selection button, a "use other animation file" selection button, an "input URL" selection button, a "use application" selection button, or a "play animation on full screen" selection button.

The user may operate the user interface 600 to set the target response effect. For example, the adjustment setting 620 of the user interface 600 may include one or more of an overdrive (OD) gain 621, a backlight pulse width modulation duty cycle 622, and a delay time 623 of a backlight pulse to the vertical synchronization signal Vsync. The user may also adjust an image parameter of the display unit 130 using the adjustment setting 620. The user may operate the user interface 600 to set a response time of the display unit 130 as the target response effect, and set the target response time to 3.0 ms or other time values. Alternatively, the user may operate the user interface 600 to set an overshoot (OS) percentage of the display unit 130 as the target response effect, and set the target overshoot percentage to 20% or other overshoot percentages.

The image quality checking animation 610 of the display unit 130 or the user interface 600 shown in FIG. 6 may present a current response effect (an image quality change). The user may examine the image quality change of the image quality checking animation 610 to decide whether to change the setting of the "target response effect". When the user is not satisfied with the response effect, the user may set/change the target response effect through the user interface 600 again. In addition, the user may also store data of the adjustment setting 620 through the user interface 600 in response to different usage situations, such as a desktop situation, a document situation, and the game or movie situation, and automatically or manually open corresponding stored setting data next time in the same situation.

Figure 7:
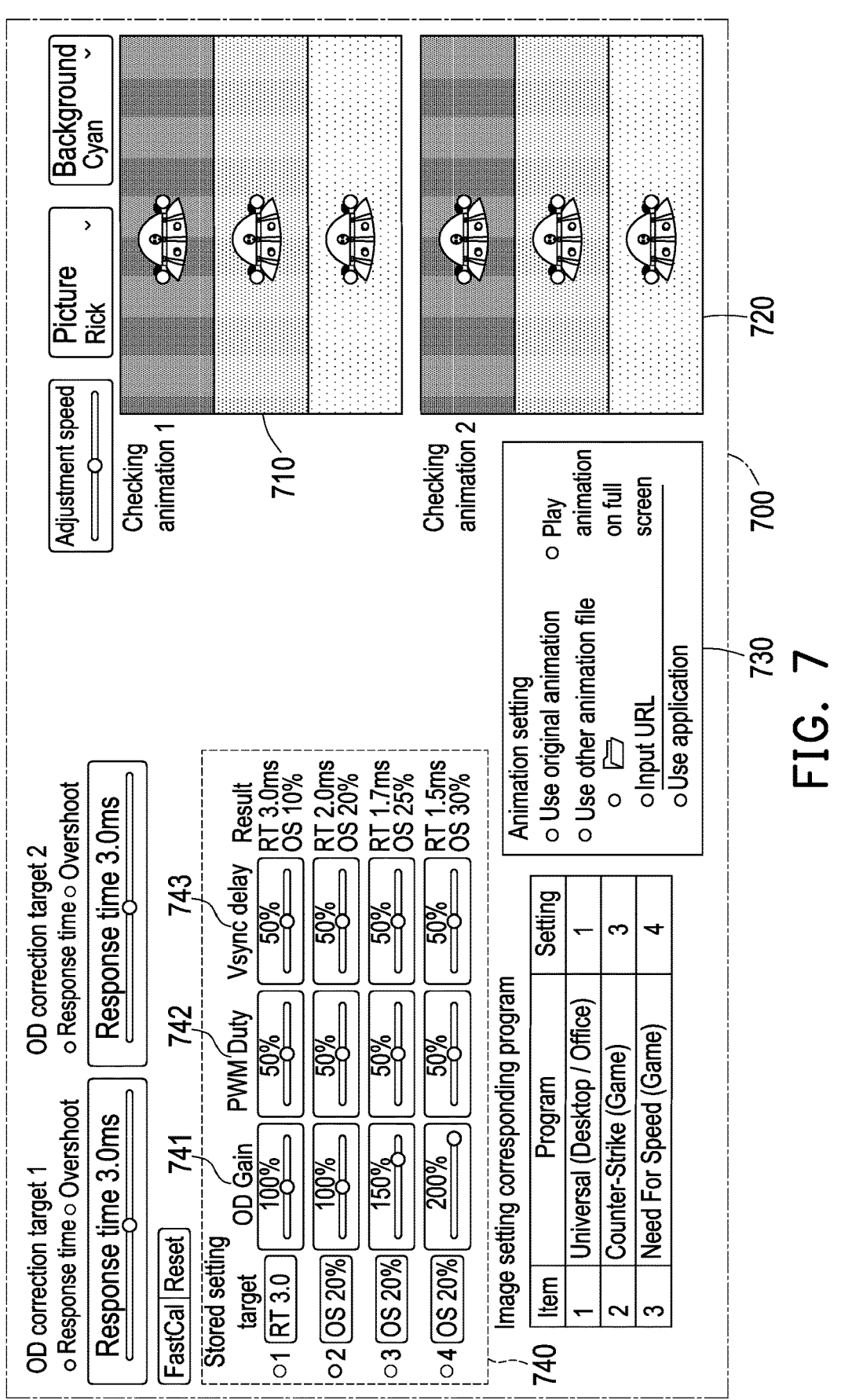
FIG. 7 is a schematic diagram of a user interface according to still another embodiment of the disclosure.

FIG. 7 is a schematic diagram of a user interface according to still another embodiment of the disclosure. A user interface 700 shown in FIG. 7 may be used as one of many examples of the user interface shown in FIG. 1. In the embodiment shown in FIG. 7, the user interface 700 includes an image quality checking animation 710, an image quality checking animation 720, an animation setting 730, and an adjustment setting 740. The adjustment setting 740 may include an overdrive gain 741, a backlight pulse width modulation duty cycle 742, and a delay time 743 of a backlight pulse to the vertical synchronization signal Vsync. Reference may be made to the relevant descriptions of the user interface 600, the image quality checking animation 610, the animation setting 611, the adjustment setting 620, the overdrive gain 621, the backlight pulse width modulation duty cycle 622, and the delay time 623 of the backlight pulse to the vertical synchronization signal Vsync shown in FIG. 6 for the user interface 700, the image quality checking animation 710, the image quality checking animation 720, the animation setting 730, the adjustment setting 740, the overdrive gain 741, the backlight pulse width modulation duty cycle 742, and the delay time 743 of the backlight pulse to the vertical synchronization signal Vsync shown in FIG. 7.

In the embodiment shown in FIG. 7, the response effect includes an "OD (overdrive) correction target 1" (a first target response effect) and an "OD correction target 2" (a second target response effect). The processing unit 110 may reflect an adjustment of the first target response effect in the image quality checking animation 710 in real time. The processing unit 110 may reflect an adjustment of the second target response effect in the image quality checking animation 720 in real time. Images of the image quality checking animation 710 and the image quality checking animation 720 are synchronized. Therefore, the user may intuitively and immediately determine a difference between two sets of settings using a difference between the image quality checking animation 710 and the image quality checking animation 720, thereby making more detailed adjustments and comparisons, and selecting the final image quality requirements.

Figure 8:
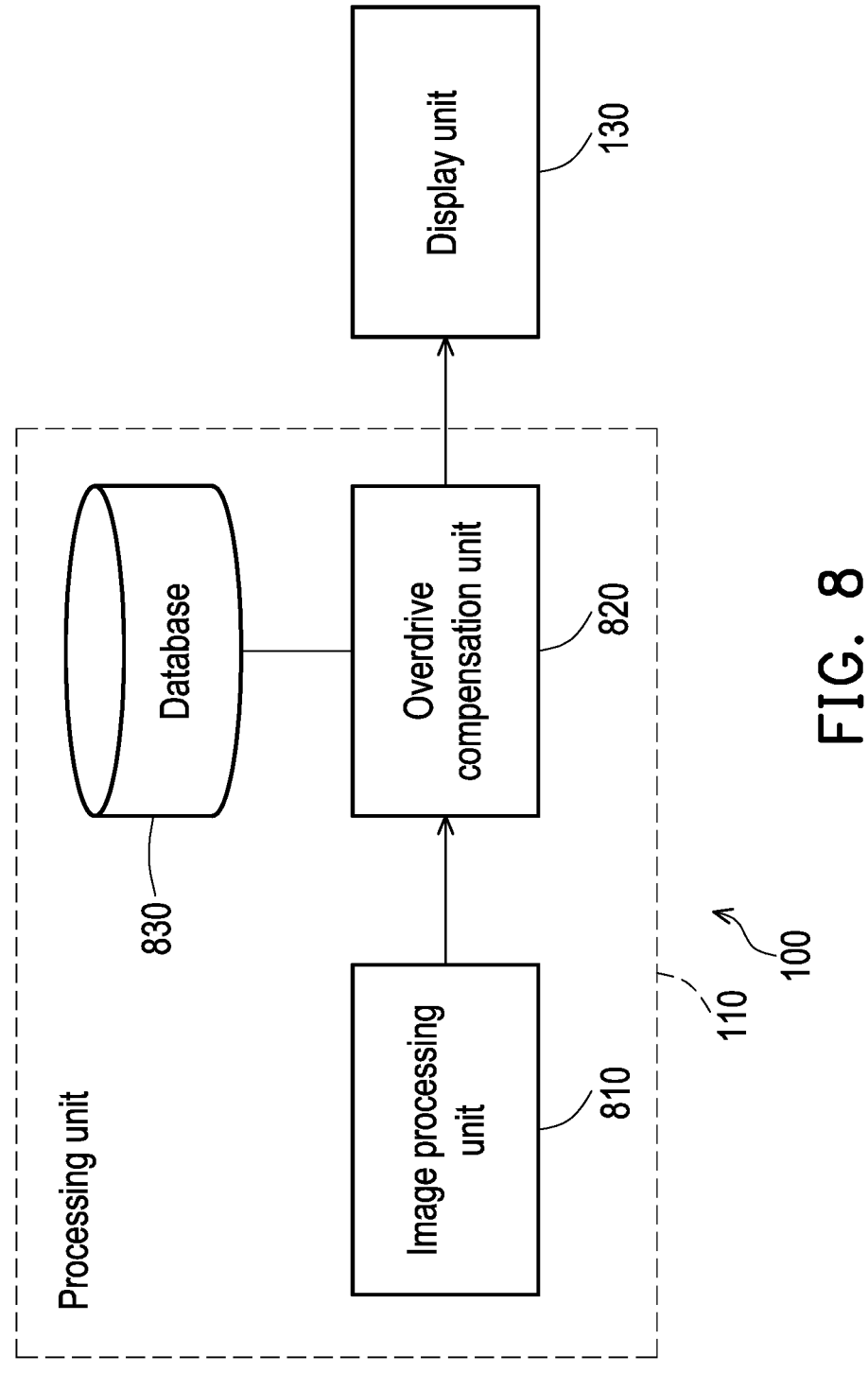
FIG. 8 is a schematic diagram of a function block of a processing unit according to an embodiment of the disclosure.

FIG. 8 is a schematic diagram of a function block of the processing unit 110 according to an embodiment of the disclosure. The processing unit 110 shown in FIG. 8 may be used as one of many implementation examples of the processing unit 110 shown in FIG. 1. Reference may be made to the relevant descriptions of the processing unit 110 and the display unit 130 shown in FIG. 1 for the processing unit 110 and the display unit 130 shown in FIG. 8, so the details will not be described again. The processing unit 110 shown in FIG. 8 includes an image processing unit 810, an overdrive compensation unit 820, and a database 830. Based on actual designs, in some embodiments, the image processing unit 810 may include an application processor (AP), a graphics processing unit (GPU), a scaler, a timing controller (TCON), or other image processing units. The overdrive compensation unit 820 is coupled to the image processing unit 810. The image processing unit 810 may provide original pixel data to the overdrive compensation unit 820. Based on actual designs, the image processing unit 810 and the overdrive compensation unit 820 may be different integrated circuits or processors. Alternatively, the image processing unit 810 and the overdrive compensation unit 820 may be integrated into the same integrated circuit or processor.

Figure 9:
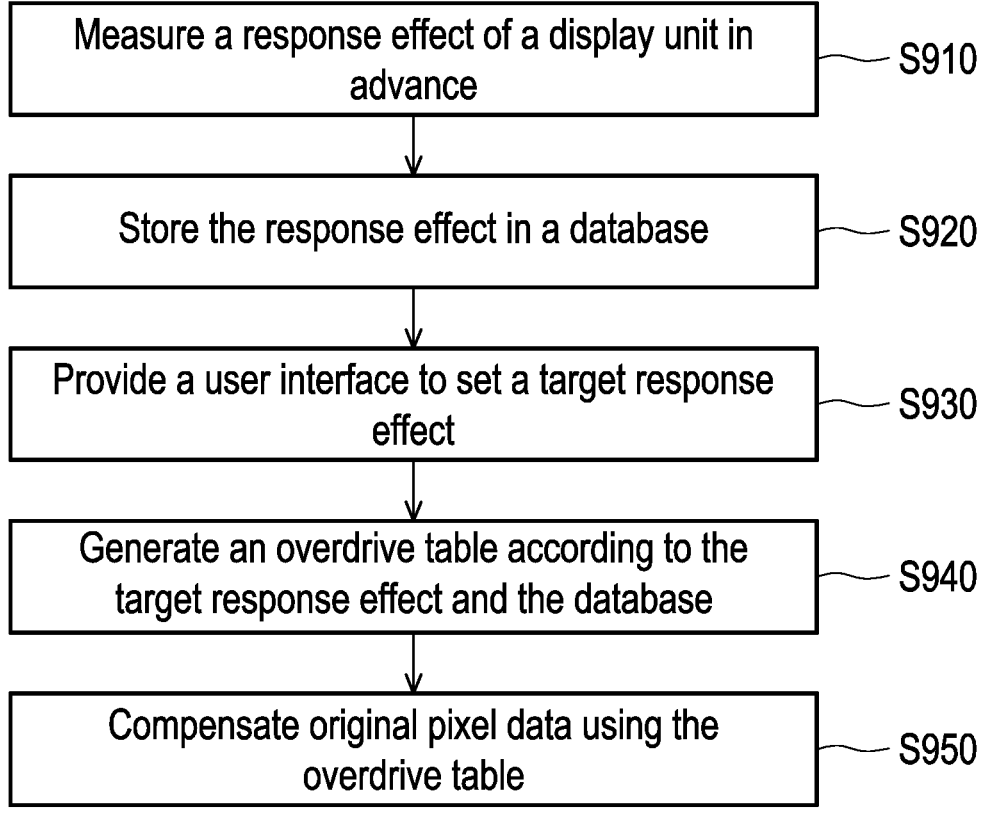
FIG. 9 is a schematic diagram of a flowchart of an overdrive lookup table generation method according to an embodiment of the disclosure.

FIG. 9 is a schematic diagram of a flowchart of an overdrive lookup table generation method according to an embodiment of the disclosure. Steps S910 and S920 shown in FIG. 9 may be offline steps. For example, before the display device 100 leaves the factory, Steps S910 and S920 may be performed for a test procedure on the display device 100 to generate the database 830 that stores a response effect of the display unit 130. Based on actual designs and applications, the response effect of the display unit 130 may include a gray-to-gray (GtG) waveform, a response time, an overshoot percentage, a ClearMR value, or other parameters of the display unit 130. ClearMR is a grading index provided by the Video Electronics Standards Association (VESA) for the motion blur performance of a digital display. The response time may include a gray-to-gray (GtG) time, a moving picture response time (MPRT), or other response times of the display unit 130.

In Step S910, a measuring equipment (not shown) may measure the response effect of the display unit 130 in advance. Alternatively, the measuring equipment may measure the response effect of the display unit 130 under different display states in advance. Based on actual designs, the display state may include a frame rate, a temperature, an overdrive (OD) value, or other states. In Step S920, the response effect of the display unit 130 may be stored in the overdrive compensation unit 820 or the database 830. Based on actual designs and applications, the overdrive compensation unit 820 and the database 830 may be configured independently or together in the cloud, a local end, a display, or other storage devices. For example, the overdrive compensation unit 820 and the database 830 are both configured in a local end computer host or a display or one of the overdrive compensation unit 820 and the database 830 is configured in the local end computer host and the other one is configured in the display, as long as both can exchange information or signals with each other.

For example, the response effect stored in the database 830 may include multiple response effect lookup tables corresponding to different overdrive (OD) values. The response effect lookup tables shown in Table 1 and Table 2 below use the overdrive values as examples of the states of the display unit 130 and use the overshoot percentages as examples of the response effects of the display unit 130. The states and the other response effects of the other display units 130 may be analogized based on the relevant descriptions of Table 1 and Table 2, so the details will not be described again. Table 1 shows the overshoot percentage of the same pixel transitioning from a grayscale (an original grayscale value) to another grayscale (a new grayscale value) under the overdrive value of "32". Table 2 shows the overshoot percentage of the same pixel transitioning from a grayscale (an original grayscale value) to another grayscale (a new grayscale value) under the overdrive value of "48". The vertical axis of Table 1 and Table 2 represents the original grayscale value, and the horizontal axis of Table 1 and Table 2 represents the new grayscale value. Due to layout limitations, Table 1 and Table 2 show the grayscale values of 9 stages. However, a grayscale value dimension and a grayscale value range of the response effect lookup table may be decided according to actual designs. In another example, the overdrive value may also be used as the state of the display unit 130, and the response time may be used as the response effect of the display unit 130 to show the response time of the same pixel transitioning from a grayscale (an original grayscale value) to another grayscale (a new grayscale value) under a specific overdrive value.

TABLE 1

| Overshoot percentage of display unit 130 under OD value of "32" | | | | | | | | |
|---|---|---|---|---|---|---|---|---|
| | | | | To | | | | |
| From | 0 | 32 | 64 | 96 | 128 | 160 | 192 | 224 | 255 |
| 0 | | 192% | 63% | 16% | 2% | 1% | 0% | 26% | 0% |
| 32 | 1% | | 137% | 46% | 14% | 1% | 1% | 30% | 0% |

TABLE 1-continued

| Overshoot percentage of display unit 130 under OD value of "32" | | | | | | | | |
| --- | --- | --- | --- | --- | --- | --- | --- | --- |
| | | | | To | | | | |
| From | 0 | 32 | 64 | 96 | 128 | 160 | 192 | 224 | 255 |
| 64 | 1% | 34% | | 107% | 36% | 11% | 3% | 33% | 0% |
| 96 | 0% | 12% | 61% | | 90% | 30% | 12% | 39% | 0% |
| 128 | 2% | 7% | 25% | 67% | | 79% | 28% | 48% | 0% |
| 160 | 1% | 4% | 13% | 25% | 64% | | 76% | 66% | 0% |
| 192 | 1% | 3% | 8% | 11% | 20% | 55% | | 122% | 0% |
| 224 | 0% | 2% | 4% | 4% | 4% | 8% | 34% | | 1% |
| 255 | 0% | 1% | 1% | 0% | 0% | 0% | 1% | 1% | |

TABLE 2

| Overshoot percentage of display unit 130 under OD value of "48" | | | | | | | | |
| --- | --- | --- | --- | --- | --- | --- | --- | --- |
| | | | | To | | | | |
| From | 0 | 32 | 64 | 96 | 128 | 160 | 192 | 224 | 255 |
| 0 | | 302% | 87% | 28% | 5% | 1% | 0% | 26% | 0% |
| 32 | 5% | | 175% | 62% | 25% | 8% | 5% | 30% | 0% |
| 64 | 1% | 34% | | 135% | 50% | 21% | 13% | 33% | 0% |
| 96 | 1% | 12% | 69% | | 115% | 43% | 24% | 39% | 0% |
| 128 | 1% | 7% | 29% | 80% | | 103% | 46% | 48% | 0% |
| 160 | 1% | 4% | 15% | 31% | 79% | | 105% | 66% | 0% |
| 192 | 0% | 3% | 10% | 16% | 28% | 70% | | 122% | 0% |
| 224 | 0% | 2% | 6% | 7% | 9% | 16% | 49% | | 1% |
| 255 | 0% | 1% | 3% | 0% | 0% | 1% | 1% | 1% | |

In Step S910, the measuring equipment (not shown) may measure the overshoot percentage (an example of the response effect) of the display unit 130 under different overdrive values (an example of the state of the display unit) in advance to obtain multiple response effect lookup tables (the response effects of the display unit 130, such as Table 1 and Table 2). In Step S920, Table 1 and Table 2 may be stored in the database 830 of the overdrive compensation unit 820.

Please refer to FIG. 8 and FIG. 9. In Step S930, a user interface may be provided to set a target response effect (for example, a target response time, a target overshoot percentage, a target ClearMR value, or other current parameters of the display unit 130). Based on actual designs and applications, the user interface may include an on-screen display (OSD), a software, a web page, or other user interfaces. The user may operate the user interface of the display device 100 to set the target response effect, and the overdrive compensation unit 820 may receive the target response effect through the user interface. For example, the user may operate the user interface of the display device 100 to set the response time of the display unit 130 as the target response effect, and set the target response time to 3.0 ms or other time values. Alternatively, the user may operate the user interface to set the overshoot percentage of the display unit 130 as the target response effect, and set the target overshoot percentage to 20% or other overshoot percentages.

In Step S940, the overdrive compensation unit 820 may search the database 830 that stores the response effect of the display unit 130 according to the target response effect to generate an overdrive lookup table corresponding to the target response effect. For example, assuming that the "target response effect" is the "overshoot percentage 20%", the overdrive compensation unit 820 may search multiple response effect lookup tables (the response effects of the display unit 130, such as Table 1 and Table 2) in the database 830 according to the "overshoot percentage of 20%" to dynamically generate an overdrive lookup table corresponding to the "overshoot percentage 20%".

In Step S950, the image processing unit 810 may provide the original pixel data to the overdrive compensation unit 820, and the overdrive compensation unit 820 may use a dynamically generated overdrive lookup table to compensate the original pixel data to generate compensated pixel data to the display unit 130. For example, the overdrive compensation unit 820 may search the overdrive lookup table based on a change in the original pixel data to obtain an overdrive compensation value corresponding to the change in the original pixel data. The overdrive compensation unit 820 compensates the original pixel data using the overdrive compensation value obtained from the overdrive lookup table to generate the compensated pixel data to the display unit 130.

An example of the dynamic generation of the overdrive lookup table is explained here. It is assumed that the response effect stored in the database 830 includes multiple response effect lookup tables respectively corresponding to different overdrive values. The overdrive compensation unit 820 may search the same position in the response effect lookup tables to obtain multiple searched response effect values corresponding to the different overdrive values. Based on actual designs and applications, the response effect lookup table of the database 830 includes a response time lookup table, an overshoot percentage lookup table, a ClearMR value lookup table, or other response effect lookup tables. For example, the response effect lookup table of the database 830 includes multiple overshoot percentage lookup tables corresponding to different overdrive values, such as Table 1 and Table 2 above.

The overdrive compensation unit 820 may generate the overdrive compensation value at the same position in the overdrive lookup table based on the target response effect, the searched response effect values, and the different overdrive values. Based on actual designs and applications, the target response effect includes a target response time, a target overshoot percentage, a target ClearMR value, or other target response effects. For example, it is assumed that the target response effect is shown in Table 3 below. In the embodiment shown in Table 3, the target overshoot percentages of the same pixel transitioning from any grayscale (the original grayscale value) to any grayscale (the new grayscale value) are all 20%. Table 3 is only a simple example, and the specific content of Table 3 may be decided according to actual designs and application. For example, each element of Table 3 may have a different target overshoot percentage. Alternatively, the user may operate the user interface of the display device 100 to set any element of Table 3.

TABLE 3

Example of target response effect

| | | | | To | | | | | |
|---|---|---|---|---|---|---|---|---|---|
| From | 0 | 32 | 64 | 96 | 128 | 160 | 192 | 224 | 255 |
| 0 | | 20% | 20% | 20% | 20% | 20% | 20% | 20% | 20% |
| 32 | 20% | | 20% | 20% | 20% | 20% | 20% | 20% | 20% |
| 64 | 20% | 20% | | 20% | 20% | 20% | 20% | 20% | 20% |
| 96 | 20% | 20% | 20% | | 20% | 20% | 20% | 20% | 20% |
| 128 | 20% | 20% | 20% | 20% | | 20% | 20% | 20% | 20% |
| 160 | 20% | 20% | 20% | 20% | 20% | | 20% | 20% | 20% |
| 192 | 20% | 20% | 20% | 20% | 20% | 20% | | 20% | 20% |
| 224 | 20% | 20% | 20% | 20% | 20% | 20% | 20% | | 20% |
| 255 | 20% | 20% | 20% | 20% | 20% | 20% | 20% | 20% | |

In other embodiments, the target response effect includes a target response effect lookup table, wherein the target response effect lookup table includes a first part and a second part, the first part includes at least one first target response effect value, the second part includes at least one second target response effect value, and the first target response effect value is different from the second target response effect value. For example, the target response effect may be the target response effect lookup table shown in Table 4 below. The target response effect lookup table includes the first part (for example, the upper right half of Table 4) and the second part (for example, the lower left half of Table 4). The first part includes, for example, the first target response effect value (for example, 20%) corresponding to "pixel data transitioning from low grayscale to high grayscale". The second part includes, for example, the second target response effect value (for example, 10%) corresponding to "pixel data transitioning from high grayscale to low grayscale". The first target response effect value is different from the second target response effect value. In other embodiments, definitions of a first step and a second step of the target response effect lookup table may be decided according to actual designs. For example, in some embodiments, the first part may be all grayscale transitions below a certain threshold grayscale (for example, grayscale 96), and the second part may be all grayscale transitions above the threshold grayscale (for example, grayscale 96). In many embodiments, the first part and the second part may not overlap with each other in each lookup table, but the implementation manner of the disclosure is not limited thereto.

12

TABLE 4

Another example of target response effect

| | | | | To | | | | | |
|---|---|---|---|---|---|---|---|---|---|
| From | 0 | 32 | 64 | 96 | 128 | 160 | 192 | 224 | 255 |
| 0 | | 20% | 20% | 20% | 20% | 20% | 20% | 20% | 20% |
| 32 | 10% | | 20% | 20% | 20% | 20% | 20% | 20% | 20% |
| 64 | 10% | 10% | | 20% | 20% | 20% | 20% | 20% | 20% |
| 96 | 10% | 10% | 10% | | 20% | 20% | 20% | 20% | 20% |
| 128 | 10% | 10% | 10% | 10% | | 20% | 20% | 20% | 20% |
| 160 | 10% | 10% | 10% | 10% | 10% | | 20% | 20% | 20% |
| 192 | 10% | 10% | 10% | 10% | 10% | 10% | | 20% | 20% |
| 224 | 10% | 10% | 10% | 10% | 10% | 10% | 10% | | 20% |
| 255 | 10% | 10% | 10% | 10% | 10% | 10% | 10% | 10% | |

The overdrive compensation unit 820 may search for the same position in the response effect lookup tables (for example, Table 1 and Table 2 above) to obtain multiple searched response effect values corresponding to different overdrive values. The overdrive compensation unit 820 may dynamically generate the overdrive compensation value at the same position in the overdrive lookup table based on the target response effect, the searched response effect values, and the different overdrive values. For example, it is assumed that the dynamically generated overdrive lookup table is Table 5 below. The overdrive compensation unit 820 may dynamically generate the overdrive compensation values at different positions in Table 5 based on Table 1, Table 2, and Table 3. It should be noted that any element (overdrive compensation value) in Table 5 is an indicative value and is not a calculated value generated based on Table 1, Table 2, and Table 3.

TABLE 5

Dynamically generated overdrive lookup table

| | | | | To | | | | | |
|---|---|---|---|---|---|---|---|---|---|
| From | 0 | 32 | 64 | 96 | 128 | 160 | 192 | 224 | 255 |
| 0 | | 16 | 24 | 43 | 61 | 71 | 63 | 31 | 0 |
| 32 | 0 | | 16 | 27 | 44 | 58 | 56 | 31 | 0 |
| 64 | 0 | 16 | | 16 | 32 | 47 | 51 | 31 | 0 |
| 96 | 0 | 32 | 16 | | 16 | 34 | 45 | 31 | 0 |
| 128 | 0 | 32 | 33 | 17 | | 19 | 35 | 31 | 0 |
| 160 | 0 | 32 | 64 | 35 | 19 | | 24 | 31 | 0 |
| 192 | 0 | 32 | 64 | 57 | 40 | 24 | | 24 | 0 |
| 224 | 0 | 32 | 64 | 95 | 65 | 59 | 65 | | 0 |
| 255 | 0 | 32 | 64 | 96 | 103 | 107 | 113 | 112 | |

For example, the overdrive compensation unit 820 may calculate Equation 1 below, where OD3 represents an overdrive compensation value at the same position in the overdrive lookup table (for example, Table 5), OD2 represents a low overdrive value among different overdrive (OD) values, OD1 represents a high overdrive value among the different overdrive values, S3 represents a target response effect (for example, the target overshoot percentage at the same position in Table 3), S2 represents a searched response effect value at the same position in a response effect lookup table corresponding to the low overdrive value OD2, and S1 represents a searched response effect value at the same position in a response effect lookup table corresponding to the high overdrive value OD1.

$$OD3 = OD2 + (OD1 - OD2) * (S3 - S2)/(S1 - S2) \qquad \text{Equation 1}$$

For example, it is assumed that the low overdrive value OD2 is "32", the high overdrive value OD1 is "48", and the target response effect S3 is "20%" as shown in Table 3. When it is necessary to calculate the overdrive compensation value of "transitioning from grayscale 0 to grayscale 96" in Table 5, the searched response effect value S2 at the same position in Table 1 corresponding to the overdrive value of "32" (the low overdrive value OD2) is "16%", the searched response effect value S1 at the same position in Table 2 corresponding to the overdrive value of "48" (the high overdrive value OD1) is "28%", and the overdrive compensation unit 820 may calculate OD3=32+ (48−32)* (20%−16%)/(28%−16%)≈37.33. That is, the overdrive compensation value at the position of "transitioning from grayscale 0 to grayscale 96" in the overdrive lookup table is 37.33. By analogy, the overdrive compensation unit 820 may calculate the overdrive compensation value at each position in the overdrive lookup table.

In some embodiments, the response effect stored in the database 830 may include multiple lookup table sets. Any lookup table set includes multiple response effect lookup tables corresponding to different overdrive values. The overdrive compensation unit 820 may dynamically select one of the lookup table sets as a selected lookup table set according to a state of at least one display unit. The overdrive compensation unit 820 searches for the same position in the response effect lookup tables of the selected lookup table set to obtain multiple searched response effect values corresponding to the different overdrive values, and the overdrive compensation unit 820 dynamically generates an overdrive compensation value at the same position in the overdrive lookup table based on the target response effect, the searched response effect values, and the different overdrive values.

For example, Table 6 below is an example of multiple lookup table sets stored in the database 830. The vertical axis of Table 6 represents frame rate, and the horizontal axis of Table 6 represents temperature. The response effect stored in the database 830 may include lookup table sets T1, T2, T3, U1, U2, U3, V1, V2, and V3 shown in Table 6. Any lookup table set shown in Table 6 may be analogized with reference to the relevant descriptions of Table 1 and Table 2 above. The overdrive compensation unit 820 may dynamically select one of the lookup table sets T1 to T3, U1 to U3, and V1 to V3 as the selected lookup table set according to a current temperature and a current frame rate (the state of the display unit). Details of the overdrive compensation unit 820 searching for the selected lookup table set may be analogized with reference to the relevant descriptions of Steps S930 to S950, so the details will not be described again.

TABLE 6

Example of multiple lookup table sets

|  | 15° C. | 20° C. | 25° C. |
|---|---|---|---|
| 60 Hz | Lookup table set T1 | Lookup table set U1 | Lookup table set V1 |
| 120 Hz | Lookup table set T2 | Lookup table set U2 | Lookup table set V2 |
| 240 Hz | Lookup table set T3 | Lookup table set U3 | Lookup table set V3 |

In the above embodiments, the response effect stored in the database 830 includes multiple overshoot percentage lookup tables. In any case, according to actual designs and applications, the response effect stored in the database 830 may include other response effects of the display unit 130. For example, in the embodiment, the response effect stored in the database 830 may include multiple gray-to-gray (GtG) waveforms without applying overdrive compensation.

Although the database 830 does not have an overshoot percentage lookup table, the overdrive compensation unit 820 may calculate an overshoot value (or an overshoot percentage) of each change in the original pixel data according to an overdrive value and the state of the display unit (for example, the current frame rate) to dynamically generate an overshoot lookup table (for example, Table 1 or Table 2) corresponding to the overdrive value. The overdrive compensation unit 820 may generate an overdrive lookup table using the overshoot lookup table (or the overshoot percentage lookup table). Reference may be made to the relevant description of Step S940 for the generation of the overdrive lookup table, so the details will not be described again.

For example, the overdrive compensation unit 820 may calculate Equation 2 below, where OS represents an overshoot value where a change in the original pixel data is "from 0 to n", n represents a grayscale value in a value range of the original pixel data, GtG [ ] represents a gray-to-gray waveform, GtG ["0 to n+OD", 1/FR] represents a brightness value in the gray-to-gray waveform "from 0 to n+OD" over time 1/FR, OD represents an overdrive value, FR represents a frame rate, and GtG ["0 to n", max] represents a maximum brightness value of the gray-to-gray waveform "from 0 to n". The overdrive compensation unit 820 calculates the overshoot value of each change in the original pixel data according to the overdrive value and the state of the display unit to generate the overshoot lookup table corresponding to the overdrive value. Referring to the relevant description of Step S940, the overdrive compensation unit 820 may generate the overdrive lookup table using the overshoot lookup table.

$$OS = GtG\left[\text{"0 to } n + OD\text{"}, 1/FR\right] - GtG[\text{"0 to } n\text{"}, \max]\qquad \text{Equation 2}$$

Figure 10:
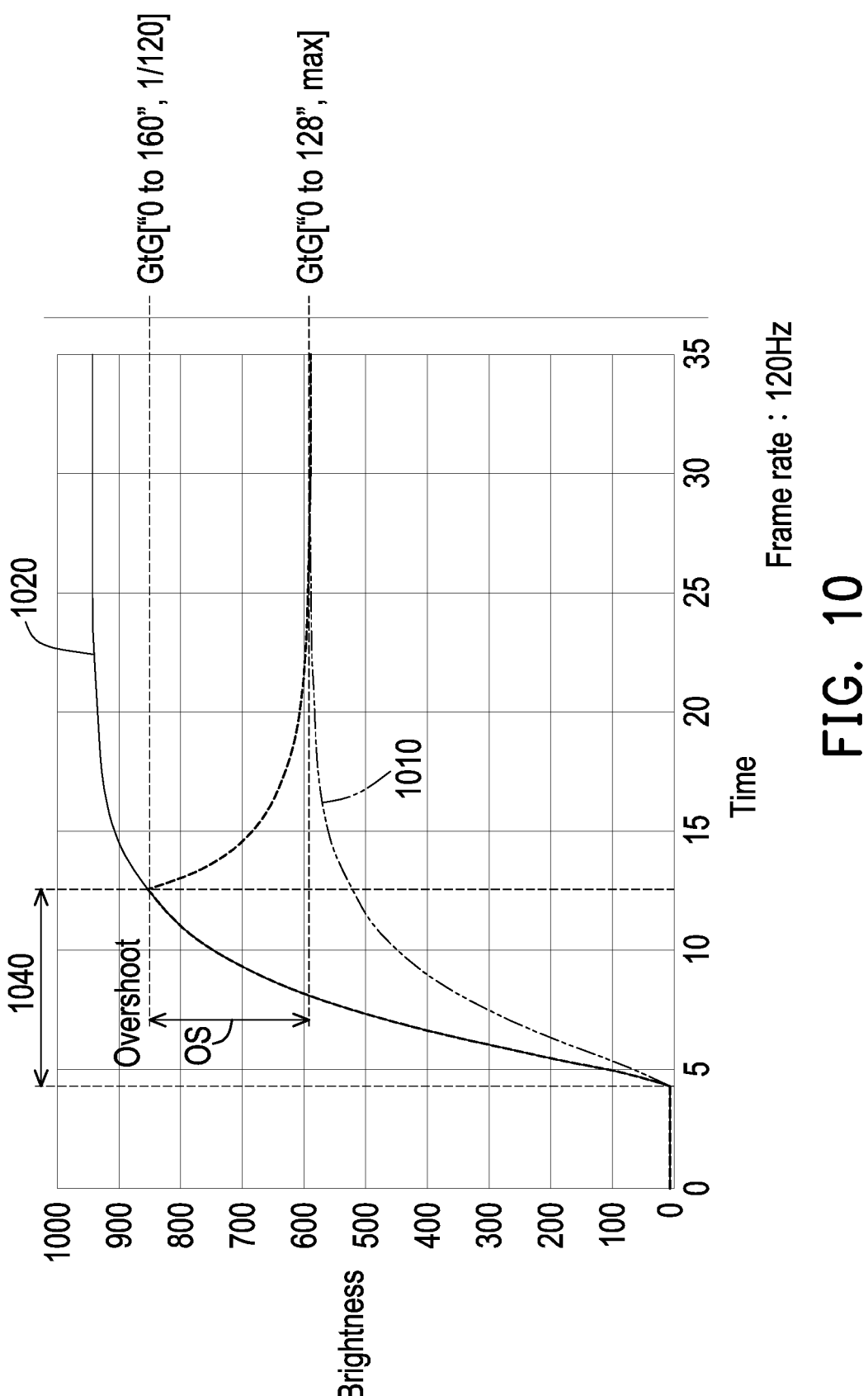
FIG. 10 is a schematic diagram of two gray-to-gray waveforms according to an embodiment of the disclosure.

FIG. 10 is a schematic diagram of two gray-to-gray waveforms according to an embodiment of the disclosure. The horizontal axis of FIG. 10 represents time, and the vertical axis of FIG. 10 represents brightness. A waveform 1010 shown in FIG. 10 represents a "grayscale 0 to grayscale 128 waveform". Taking calculation of overshoot of grayscale 0 to 128 under a condition of "frame rate being 120 Hz, overdrive value being 32" as an example, since target grayscale 128 plus overdrive value 32 is 160, it means that a waveform 1020 of a "grayscale 0 to grayscale 160 waveform" is shown in FIG. 10. The overdrive compensation unit 820 may calculate Equation 2 to obtain an overshoot value OS of the change "from 0 to 128" in the original pixel data. In the example shown in FIG. 10, n is 128, a time interval 1040 is ¹⁄₁₂₀, GtG ["0 to 128+32", ¹⁄₁₂₀] represents a brightness value of the waveform 1020 over time ¹⁄₁₂₀ (the time interval 1040), an overdrive value OD is 32, a frame rate FR is 120 Hz, and GtG ["0 to 128", max] represents a maximum brightness value of the waveform 1010. The overdrive compensation unit 820 may calculate the overshoot value OS-GtG ["0 to 160", ¹⁄₁₂₀]-GtG ["0 to 128", max] "from grayscale 0 to grayscale 128". By analogy, the overdrive compensation unit 820 calculates the overshoot value of each change in the original pixel data according to the overdrive value and the state of the display unit to dynamically generate the overshoot lookup table corresponding to the overdrive value.

In other embodiments, the response effect stored in the database 830 may include multiple first response effect lookup tables corresponding to different overdrive values and multiple second response effect lookup tables corresponding to different overdrive values. For example, the response effect stored in the database 830 may include multiple overshoot percentage lookup tables corresponding to different overdrive values and multiple response time lookup tables corresponding to different overdrive values. The overdrive compensation unit 820 may search for the same position in the overshoot percentage lookup tables (the first response effect lookup tables) stored in the database 830 to obtain multiple overshoot percentages (first searched response effect values) corresponding to different overdrive values. The overdrive compensation unit 820 generates an overdrive compensation value at the same position in the overdrive lookup table based on the target response effect, the first searched response effect values, and the different overdrive value. Therefore, the overdrive compensation unit 820 may dynamically calculate the overdrive lookup table corresponding to the target response effect (such as the target overshoot percentage of 20%). Reference may be made to the relevant description of Step S940 for the generation of the overdrive lookup table, so the details will not be described again. Then, the overdrive compensation unit 820 may back-check the second response effect lookup tables stored in the database 830 according to the content of the overdrive lookup table corresponding to the target response effect to calculate a second response effect value corresponding to the target response effect.

For example, it is assumed that the database 830 stores the overshoot percentage lookup tables (the first response effect lookup tables) corresponding to different overdrive values and the response time lookup tables (the second response effect lookup tables) corresponding to different overdrive values. The overdrive compensation unit 820 may search for a response time at the same position in the response time lookup table (the second response effect lookup table) corresponding to the target overdrive compensation value based on the target overdrive compensation value at any position in the overdrive lookup table, thereby obtaining the response time of each change in the original pixel data. For example, it is assumed that the dynamically generated overdrive lookup table is Table 5, and the target response effect is the target overshoot percentage "20%". The overdrive compensation unit 820 may retrieve the overdrive compensation value "16" of "the change from 0 to 32 of the original pixel data" from Table 5, and then retrieve a response time value of "the change from 0 to 32 of the original pixel data" from the response time lookup table corresponding to the overdrive value "16". By analogy, the overdrive compensation unit 820 may retrieve the response time (multiple response times corresponding to the target overshoot percentage "20%") of each change in the original pixel data from different response time lookup tables of the database 830 based on the content of Table 5. In some embodiments, the overdrive compensation unit 820 may provide the response times (the second response effect values) corresponding to the target overshoot percentage "20%" to the user. In other embodiments, the overdrive compensation unit 820 may average the response times corresponding to the target overshoot percentage "20%" to generate an average response time (the second response effect value) for the user.

According to different designs, in some embodiments, the processing unit 110, the image processing unit 810, the overdrive compensation unit 820, and/or the database 830 may be implemented as hardware circuits. In other embodiments, the processing unit 110, the image processing unit 810, the overdrive compensation unit 820, and/or the database 830 may be implemented in firmware or software (that is, a program). In some embodiments, the processing unit 110, the image processing unit 810, the overdrive compensation unit 820, and/or the database 830 may be implemented in a combination of firmware and software. In some embodiments, the processing unit 110, the image processing unit 810, the overdrive compensation unit 820, and/or the database 830 may be implemented in a combination of hardware, firmware, and software.

In terms of hardware, the processing unit 110, the image processing unit 810, the overdrive compensation unit 820, and/or the database 830 may be implemented as logic circuits on an integrated circuit. For example, the relevant functions of the processing unit 110, the image processing unit 810, the overdrive compensation unit 820, and/or the database 830 may be implemented in one or more controllers, microcontrollers, microprocessors, application-specific integrated circuits (ASICs), digital signal processors (DSPs), field programmable gate arrays (FPGAs), central processing units (CPUs), and/or various logic blocks, modules, and circuits in other processing units. The relevant functions of the processing unit 110, the image processing unit 810, the overdrive compensation unit 820, and/or the database 830 may be implemented as hardware circuits, such as various logic blocks, modules, and circuits in integrated circuits, using hardware description languages (for example, Verilog HDL or VHDL) or other suitable programming languages.

In terms of software and/or firmware, the relevant functions of the processing unit 110, the image processing unit 810, the overdrive compensation unit 820, and/or the database 830 may be implemented as programming codes. For example, the processing unit 110, the image processing unit 810, the overdrive compensation unit 820, and/or the database 830 are implemented using general programming languages (for example, C, C++, or assembly language) or other suitable programming languages. The programming codes may be recorded/stored in a "non-transitory machine-readable storage medium". In some embodiments, the non-transitory machine-readable storage medium includes, for example, a semiconductor memory and/or a storage device such as the cloud, a local end, or a server. An electronic equipment (for example, a computer, a CPU, a controller, a microcontroller, or a microprocessor) may read and execute the programming codes from the non-transitory machine-readable storage medium, thereby implementing the relevant functions of the processing unit 110, the image processing unit 810, the overdrive compensation unit 820, and/or the database 830.

Figure 11:
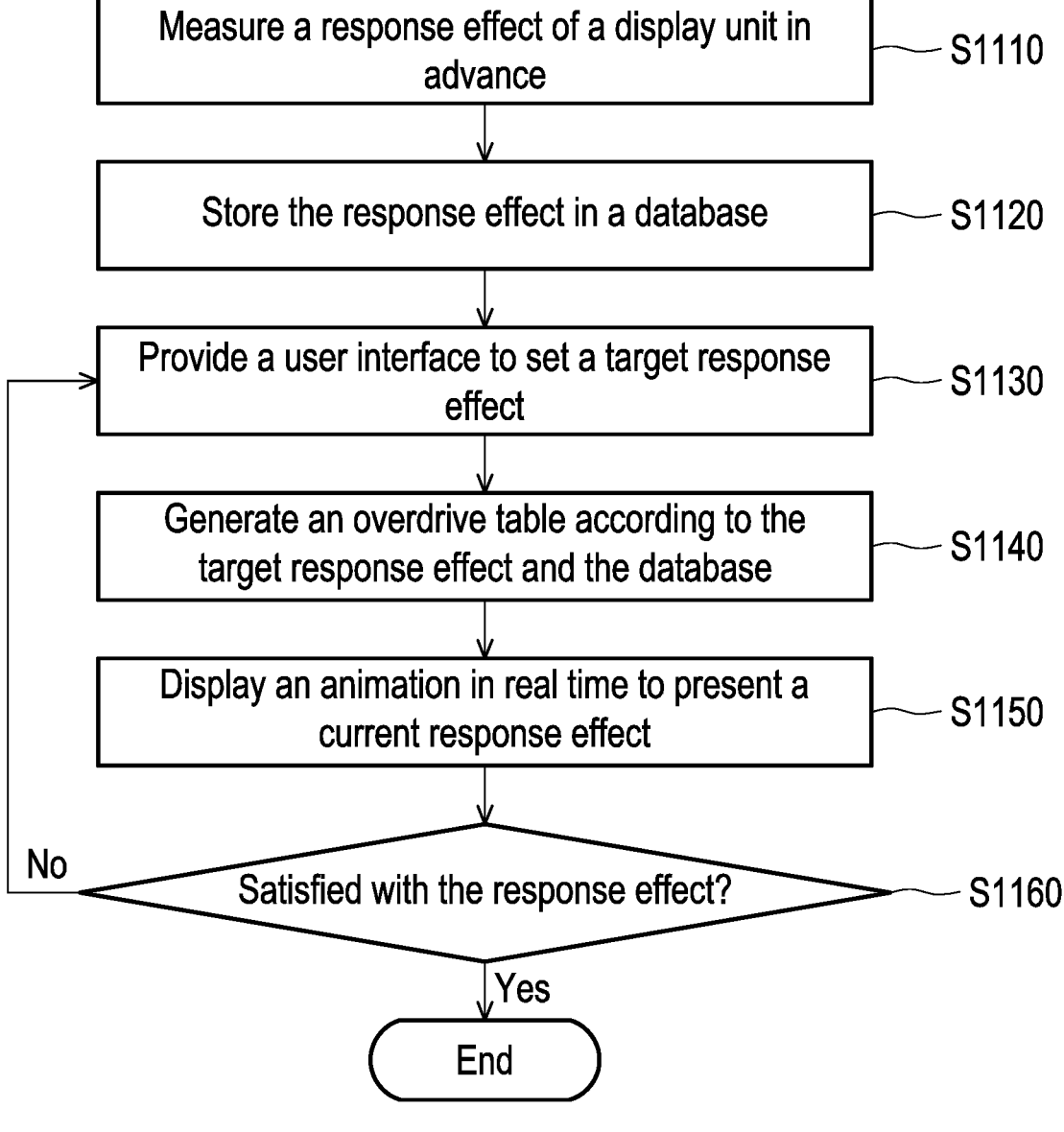
FIG. 11 is a schematic diagram of a flowchart of an overdrive lookup table generation method according to another embodiment of the disclosure.

FIG. 11 is a schematic diagram of a flowchart of an overdrive lookup table generation method according to another embodiment of the disclosure. Steps S1110 and S1120 shown in FIG. 11 may be offline steps. Steps S1110, S1120, S1130, and S1140 shown in FIG. 11 may be analogized with reference to the relevant descriptions of Steps S910, S920, S930, and S940 shown in FIG. 9, so the details will not be described again. In Step S1150 shown in FIG. 11, the display device 100 may display an animation in real time, non-real time, automatically, or upon a command by the user to present the current response effect. That is, the user interface may include the image quality checking animation and the adjustment setting.

Please refer to FIG. 6, FIG. 8, and FIG. 11. The user may operate the user interface 600 of the display device 100 to set the target response effect, and the overdrive compensation unit 820 may receive the target response effect through the user interface 600 (Step S1130). For example, the user may operate the user interface 600 of the display device 100 to set the response time of the display unit 130 as the target response effect, and set the target response time to 3.0 ms or other time values. Alternatively, the user may operate the user interface 600 to set the overshoot percentage of the display unit 130 as the target response effect, and set the target overshoot percentage to 20% or other overshoot percentages.

In Step S1140, the overdrive compensation unit 820 may search the database 830 that stores the response effect of the display unit 130 according to the target response effect to generate the overdrive lookup table corresponding to the target response effect. For example, assuming that the "target response effect" is the "overshoot percentage 20%" (for example, Table 3), the overdrive compensation unit 820 may search multiple response effect lookup tables (the response effect of the display unit 130, such as Table 1 and Table 2) in the database 830 according to the "overshoot percentage 20%" to dynamically generate the overdrive lookup table (for example, Table 5) corresponding to the "overshoot percentage 20%". In Step S1150, the overdrive compensation unit 820 may compensate the original pixel data from the image processing unit 810 using the dynamically generated overdrive lookup table to generate the compensated pixel data to the display unit 130. The user interface 600 shown in FIG. 6 includes the image quality checking animation 610 to present the current response effect. After the user interface 600 receives the "target response effect", based on the compensation of the overdrive compensation unit 820, the image quality checking animation 610 (the compensated pixel data) displayed by the display unit 130 in Step S1150 may generate the image quality change in real time. The user may examine the image quality change of the image quality checking animation 610 to decide whether to change the setting of the "target response effect". When the user is not satisfied with the response effect (the determination result of Step S1160 is "No"), the user may set/change the target response effect through the user interface 600 again (return to Step S1130). In addition, the user interface may also include the adjustment setting 620. The user may also use the adjustment setting 620 of the user interface 600 to further adjust other image parameters. For example, the adjustment setting 620 includes, for example, one or more of the overdrive (OD) gain 621, the LCD backlight pulse width modulation (PWM) duty cycle 622, or the delay time 623 of the LCD backlight pulse to the vertical synchronization signal (Vsync delay time). An input of the adjustment setting 620 is not limited to before or after the overdrive compensation unit 820 compensates.

Figure 12:
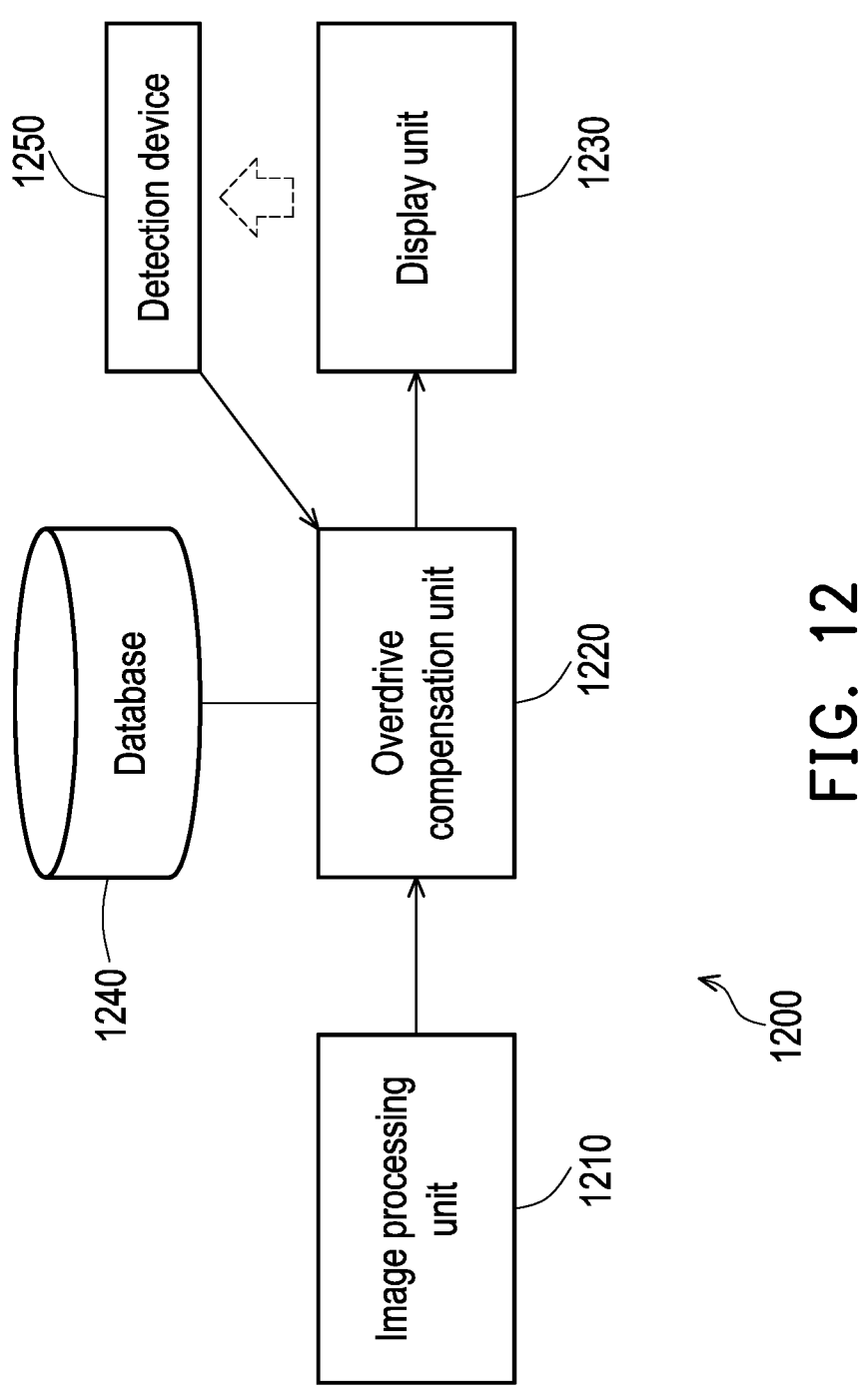
FIG. 12 is a schematic diagram of a function block of a display device according to another embodiment of the disclosure.

FIG. 12 is a schematic diagram of a function block of a display device 1200 according to another embodiment of the disclosure. The display device 1200 shown in FIG. 12 includes an image processing unit 1210, an overdrive compensation unit 1220, a display unit 1230, a database 1240, and a detection device 1250. The display device 1200, the image processing unit 1210, the overdrive compensation unit 1220, the display unit 1230, and the database 1240 shown in FIG. 12 may be analogized with reference to the relevant descriptions of the display device 100, the image processing unit 810, the overdrive compensation unit 820, the display unit 130, and the database 830 shown in FIG. 8, so the details will not be described again. In the embodiment shown in FIG. 12, the detection device 1250 is coupled to the overdrive compensation unit 1220. The detection device 1250 correspondingly detects the image quality of the display unit 1230 (the display), and determines whether the image quality meets the target response effect (for example, the target overshoot percentage "20%" or other response effects).

Figure 13:
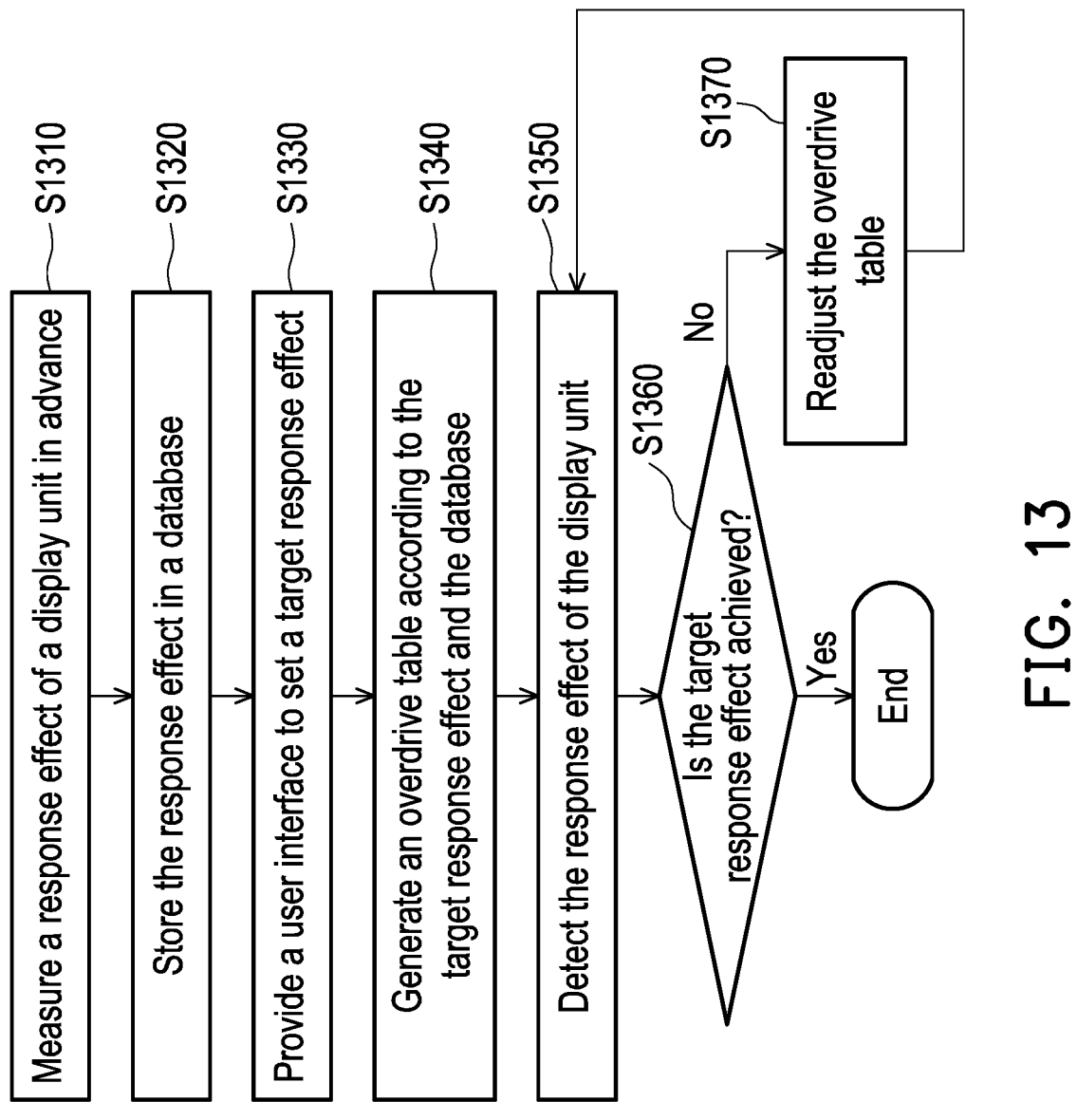
FIG. 13 is a schematic diagram of a flowchart of an overdrive lookup table generation method according to still another embodiment of the disclosure.

FIG. 13 is a schematic diagram of a flowchart of an overdrive lookup table generation method according to still another embodiment of the disclosure. Steps S1310 and S1320 shown in FIG. 13 may be offline steps. Steps S1310, S1320, S1330, and S1340 shown in FIG. 13 may be analogized with reference to the relevant descriptions of Steps S910, S920, S930, and S940 shown in FIG. 9, so the details will not be described again. In Step S1350 shown in FIG. 13, the detection device 1250 may detect the image quality (the display response effect) of the display unit 1230, and determine whether the image quality meets the target response effect (for example, the target overshoot percentage "20%" or other response effects). When the image quality of the display unit 1230 does not match the target response effect (the determination result of Step S1360 is "No"), the detection device 1250 commands the overdrive compensation unit 1220 to readjust an overdrive table (Step S1370) to provide recompensated pixel data, and the detection device 1250 then detects the image quality of the display unit 1230 again (return to Step S1350). Such a manner can prevent causing the response effect of the test procedure stored in the database 830 before leaving the factory to be different from the current one due to aging or other wear and tear of a product after the user uses the product for a long time. The detection device 1250 may readjust the overdrive table or even update the response effect stored in the database 830.

Figure 14:
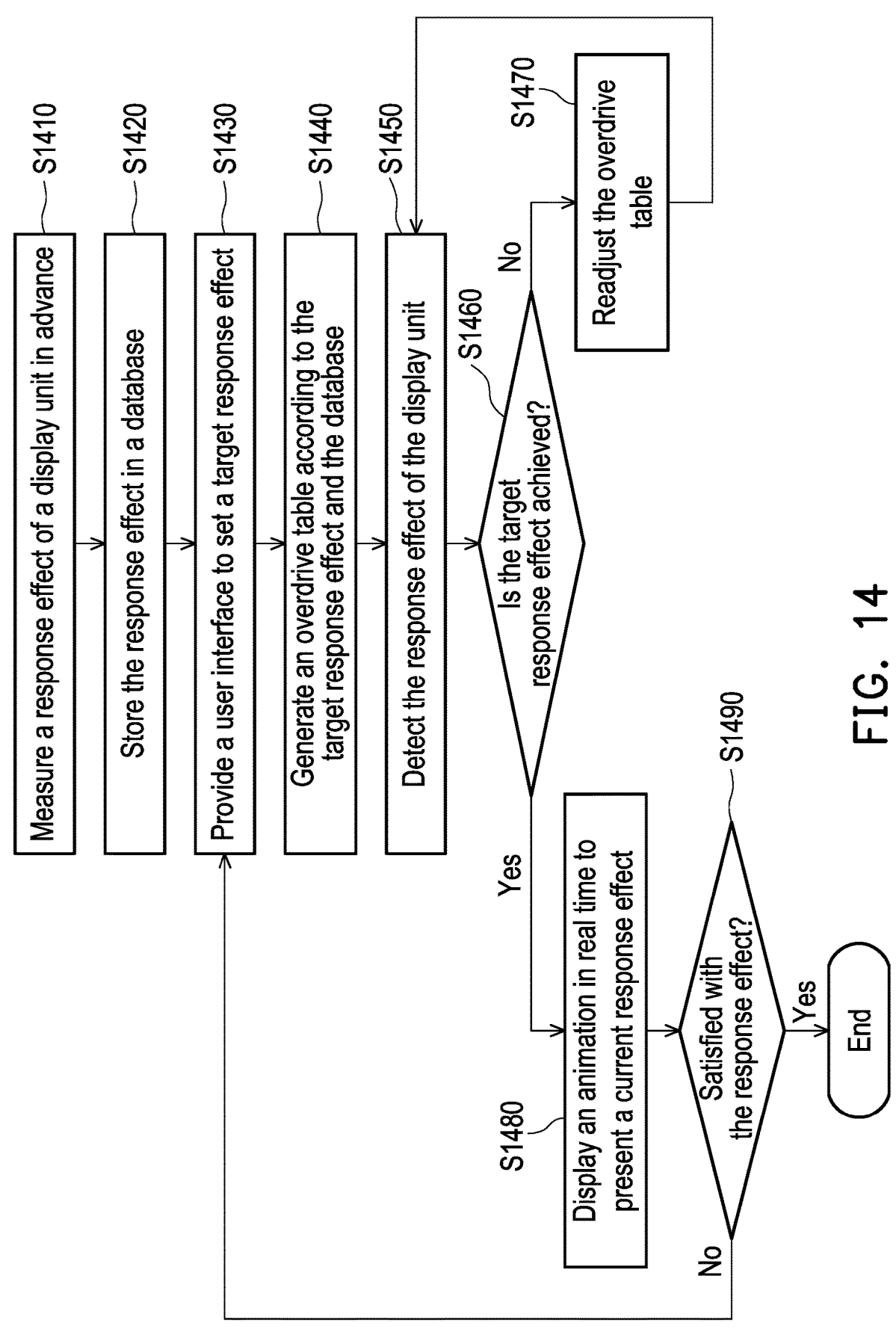
FIG. 14 is a schematic diagram of a flowchart of an overdrive lookup table generation method according to yet another embodiment of the disclosure.

FIG. 14 is a schematic diagram of a flowchart of an overdrive lookup table generation method according to yet another embodiment of the disclosure. Steps S1410 and S1420 shown in FIG. 14 may be offline steps. Steps S1410, S1420, S1430, and S1440 shown in FIG. 14 may be analogized with reference to the relevant descriptions of Steps S910, S920, S930, and S940 shown in FIG. 9, and Steps S1450, S1460, and S1470 shown in FIG. 14 may be analogized with reference to the relevant descriptions of Steps S1350, S1360, and S1370 shown in FIG. 13, so the details will not be described again. When the detection result of Step S1450 shown in FIG. 14 indicates that the image quality (the response effect) of the display unit 1230 meets the target response effect (for example, the target overshoot percentage "20%" or other target response effects), that is, the determination result of Step S1460 is "Yes", the display device 100 may display the animation in real time to present the current response effect (Step S1480). That is, the user interface 600 may include the image quality checking animation 610 to present the current response effect in real time. Steps S1480 and S1490 shown in FIG. 14 may be analogized with reference to the relevant descriptions of Steps S1150 and S1160 shown in FIG. 11, so the details will not be described again. When the user is not satisfied with the response effect (the determination result of Step S1490 is "No"), the user may set/change the target response effect through the user interface 600 again (return to Step S1430). After the user is satisfied with the response effect, at least one set of current settings may be stored corresponding to different usage situations, scenarios, applications, or even spaces where the display device 100 itself is located. Different settings are used automatically by the display device 100 or manually by the user in response to different usage forms.

In summary, in the above embodiments, the user may operate the display device to set the target response effect. Based on actual designs and applications, the target response effect may include the target response time, the target overshoot percentage, the target ClearMR value, or other current parameters of the display unit. The overdrive compensation unit may dynamically generate the overdrive lookup table corresponding to the target response effect according to the target response effect (the current parameter) and the database of the response effect.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A display device, comprising:
a display unit; and
a processing unit, coupled to the display unit, wherein the processing unit provides a user interface through the display unit to prompt a user to adjust at least one response effect, the processing unit presents an image quality checking animation through the display unit or the user interface, and the processing unit reflects an adjustment of the at least one response effect in the image quality checking animation in real time, wherein the at least one response effect includes a gray-to-gray response time, a gray-to-gray overshoot, or a motion blur performance grading index value.

2. The display device according to claim 1, wherein the user interface comprises an animation setting, and the animation setting at least comprises a use original animation selection button, a use other animation file selection button, an input URL selection button, a use application selection button, or a play animation on full screen selection button.

3. The display device according to claim 1, wherein the at least one response effect comprises a first target response effect and a second target response effect, the image quality checking animation comprises a first image quality checking animation and a second image quality checking animation, the processing unit reflects an adjustment of the first target response effect in the first image quality checking animation in real time, the processing unit reflects an adjustment of the second target response effect in the second image quality checking animation in real time, and the first image quality checking animation and the second image quality checking animation are synchronized.

4. The display device according to claim 1, wherein the user interface comprises an adjustment setting, and the adjustment setting at least comprises an overdrive gain, a backlight pulse width modulation duty cycle, a delay time of a backlight pulse to a vertical synchronization signal, or at least one backlight parameter of a backlight unit.

5. The display device according to claim 4, wherein the user interface further comprises a backlight parameter waveform diagram, and the processing unit adjusts the backlight parameter waveform diagram in real time based on an adjustment result of the at least one backlight parameter.

6. The display device according to claim 4, wherein the at least one backlight parameter comprises a pulse width modulation delay, a pulse width modulation frequency, a pulse width modulation duty cycle, a pulse width modulation gain, a number of backlight pulses, a pulse width modulation start position, a pulse width modulation end position, synchronization enable of a backlight pulse to a vertical synchronization signal, or synchronization enable of a backlight pulse to a variable refresh rate vertical synchronization signal.

7. The display device according to claim 4, wherein the at least one backlight parameter comprises a plurality of pulse width modulation parameter sets, the processing unit generates a corresponding pulse width modulation signal based on each of the pulse width modulation parameter sets, the processing unit superimposes the corresponding pulse width modulation signal of each of the pulse width modulation parameter sets to generate a superimposed signal, and the processing unit drives the backlight unit using the superimposed signal to provide a backlight to the display unit.

8. The display device according to claim 7, wherein the processing unit comprises:
a plurality of pulse width modulation units, wherein each of the pulse width modulation units generates a corresponding pulse width modulation signal based on a corresponding pulse width modulation parameter set among the pulse width modulation parameter sets; and
a superposition unit, coupled to the pulse width modulation units to receive the corresponding pulse width modulation signal of each of the pulse width modulation parameter sets, wherein the superposition unit generates the superposed signal to the backlight unit.

9. The display device according to claim 4, wherein in response to a vertical synchronization signal of the display unit being adjusted to different frequencies, the processing unit sets the at least one backlight parameter to different parameter values.

10. The display device according to claim 4, wherein the at least one backlight parameter comprises a first backlight parameter and a second backlight parameter, the image quality checking animation comprises a first portion and a second portion, the processing unit adjusts the driving of the backlight unit based on the first backlight parameter to reflect an adjustment of the first backlight parameter in the first portion in real time, and the processing unit adjusts the driving of the backlight unit based on the second backlight parameter to reflect an adjustment of the second backlight parameter in the second portion in real time.

11. A display device comprising:
a display unit; and
a processing unit coupled to the display unit, wherein the processing unit provides a user interface through the display unit to prompt a user to adjust at least one response effect, the processing unit presents an image quality checking animation through the display unit or the user interface, the processing unit reflects an adjustment of the at least one response effect in the image quality checking animation in real time, the user interface comprises an adjustment setting, and the adjustment setting at least comprises an overdrive gain, a backlight pulse width modulation duty cycle, or a delay time of a backlight pulse to a vertical synchronization signal.

12. A display device comprising:
a display unit; and
a processing unit, coupled to the display unit, wherein the processing unit provides a user interface through the display unit to prompt a user to adjust at least one response effect, the processing unit presents an image quality checking animation through the display unit or the user interface, the processing unit reflects an adjustment of the at least one response effect in the image quality checking animation in real time, the at least one response effect comprises a target response effect, and the processing unit comprises:
an overdrive compensation unit, coupled to the display unit, wherein the overdrive compensation unit receives the target response effect through the user interface, the overdrive compensation unit searches a database that stores a response effect of the display unit according to the target response effect to generate an overdrive lookup table corresponding to the target response effect, and the overdrive compensation unit compensates original pixel data using the overdrive lookup table to generate compensated pixel data.

13. The display device according to claim 12, wherein the response effect stored in the database comprises a plurality of response effect lookup tables corresponding to different overdrive values, the overdrive compensation unit searches for a same position in the response effect lookup tables to obtain a plurality of searched response effect values corresponding to the different overdrive values, and the overdrive compensation unit generates an overdrive compensation value at the same position in the overdrive lookup table based on the target response effect, the searched response effect values, and the different overdrive values.

14. The display device according to claim 13, wherein the target response effect comprises a target response time, a target overshoot percentage, or a target motion blur performance grading index value, and the response effect lookup table comprises at least one response time lookup table, at least one overshoot percentage lookup table, or at least one motion blur performance grading index value lookup table.

15. The display device according to claim 12, wherein the response effect stored in the database comprises a plurality of lookup table sets, any one of the lookup table sets comprises a plurality of response effect lookup tables corresponding to different overdrive values, the overdrive compensation unit selects one of the lookup table sets as a selected lookup table set according to a state of at least one display unit, the overdrive compensation unit searches for a same position in the response effect lookup tables of the selected lookup table set to obtain a plurality of searched response effect values corresponding to the different overdrive values, and the overdrive compensation unit generates an overdrive compensation value at the same position in the overdrive lookup table based on the target response effect, the searched response effect values, and the different overdrive values.

16. The display device according to claim 12, wherein the target response effect comprises a target response effect lookup table, the target response effect lookup table comprises a first part and a second part, the first part and the second part do not overlap with each other, the first part comprises at least one first target response effect value, the second part comprises at least one second target response effect value, and the at least one first target response effect value is different from the at least one second target response effect value.

17. The display device according to claim 12, wherein the response effect stored in the database comprises a plurality of first response effect lookup tables corresponding to different overdrive values and a plurality of second response effect lookup tables corresponding to different overdrive values, the overdrive compensation unit searches for a same position in the first response effect lookup tables to obtain a plurality of first searched response effect values corresponding to the different overdrive values, the overdrive compensation unit generates an overdrive compensation value at the same position in the overdrive lookup table based on the target response effect, the first searched response effect values, and the different overdrive values, and the overdrive compensation unit back-checks the second response effect lookup tables according to a content of the overdrive lookup table to calculate a second response effect value corresponding to the target response effect.

18. The display device according to claim 17, wherein the target response effect comprises a target overshoot percentage, the first response effect lookup table comprises at least one overshoot percentage lookup table, and the second response effect lookup table comprises at least one response time lookup table.

19. The display device according to claim 12, further comprising:

a detection device, coupled to the overdrive compensation unit, wherein the detection device directly detects an image quality of a display unit and determines whether the image quality meets the target response effect, wherein when the image quality does not match the target response effect, the detection device commands the overdrive compensation unit to provide recompensated pixel data.

20. The display device according to claim 12, further comprising:

a detection device, coupled to the database, wherein the detection device directly detects a detection response effect of a display unit, wherein when the detection response effect does not match the response effect stored in the database, the response effect stored in the database is updated.

* * * * *